United States Patent
Hasuike et al.

(10) Patent No.: US 12,378,405 B2
(45) Date of Patent: Aug. 5, 2025

(54) RESIN COMPOSITION, FILM, COMPOSITE MATERIAL, MOVING BODY, AND THREE-DIMENSIONAL PRINTING MATERIAL

(71) Applicant: MITSUBISHI CHEMICAL CORPORATION, Tokyo (JP)

(72) Inventors: Masayasu Hasuike, Tokyo (JP); Nao Yamasue, Tokyo (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 654 days.

(21) Appl. No.: 17/708,156

(22) Filed: Mar. 30, 2022

(65) Prior Publication Data

US 2022/0220303 A1    Jul. 14, 2022

Related U.S. Application Data

(63) Continuation of application No. PCT/JP2020/037149, filed on Sep. 30, 2020.

(30) Foreign Application Priority Data

Oct. 1, 2019 (JP) .................. 2019-181196

(51) Int. Cl.
| | |
|---|---|
| *C08L 71/00* | (2006.01) |
| *B29C 64/118* | (2017.01) |
| *B29C 64/209* | (2017.01) |
| *B29K 71/00* | (2006.01) |
| *B29K 81/00* | (2006.01) |
| *B33Y 30/00* | (2015.01) |
| *B33Y 70/00* | (2020.01) |
| *C08J 5/24* | (2006.01) |
| *C08L 81/06* | (2006.01) |

(52) U.S. Cl.
CPC ............ *C08L 71/00* (2013.01); *B29C 64/118* (2017.08); *B29C 64/209* (2017.08); *B33Y 30/00* (2014.12); *B33Y 70/00* (2014.12); *C08J 5/24* (2013.01); *C08L 81/06* (2013.01); *B29K 2071/00* (2013.01); *B29K 2081/06* (2013.01)

(58) Field of Classification Search
None
See application file for complete search history.

(56) References Cited

U.S. PATENT DOCUMENTS

| | | | | |
|---|---|---|---|---|
| 6,228,467 B1 * | 5/2001 | Taniguchi | ............... | C08L 71/00 |
| | | | | 428/209 |
| 8,945,694 B2 * | 2/2015 | Aneja | ..................... | C08L 71/10 |
| | | | | 524/542 |
| 9,000,087 B2 | 4/2015 | El-Hibri et al. | | |
| 2010/0159224 A1 | 6/2010 | Donovan et al. | | |
| 2011/0104417 A1 | 5/2011 | Wang et al. | | |
| 2017/0362386 A1 | 12/2017 | Xu et al. | | |

FOREIGN PATENT DOCUMENTS

| | | |
|---|---|---|
| CZ | 2008372 A3 | 2/2009 |
| EP | 0138128 A1 * | 4/1985 |
| JP | 2004182832 A | 7/2004 |
| JP | 2006341596 A | 12/2006 |
| JP | 2009508997 A | 3/2009 |
| JP | 2009508998 A | 3/2009 |
| JP | 2010510377 A | 4/2010 |
| JP | 2015049269 A | 3/2015 |
| JP | 2019156974 A * | 9/2019 |

OTHER PUBLICATIONS

English Machine Translation of JP 2019156974 A (Year: None).*
Supplementary European Search Report issued Oct. 10, 2022 in Patent Application No. 20870718.2, 11 pages.
International Search Report issued Dec. 22, 2020 in PCT/JP2020/037149 (with English translation), 12 pages.
Extended European Search Report issued Jan. 12, 2023 in Patent Application No. 20870718.2, 9 pages.

* cited by examiner

*Primary Examiner* — Randy P Gulakowski
*Assistant Examiner* — Holley Grace Hester
(74) *Attorney, Agent, or Firm* — Element IP, PLC

(57) ABSTRACT

A resin composition with high heat resistance, melt formability, and secondary processability is provided. A resin composition containing: a poly(aryl ether ketone) resin (A); and a poly(ether imide sulfone) resin (B), wherein the poly(aryl ether ketone) resin (A) and the poly(ether imide sulfone) resin (B) are compatibly mixed. The poly(aryl ether ketone) resin (A) is preferably a poly(ether ketone ketone) resin with a repeating unit (a-1) represented by the following formula (1A) and a repeating unit (a-2) represented by the following formula (2A), and the resin composition has one glass transition temperature.

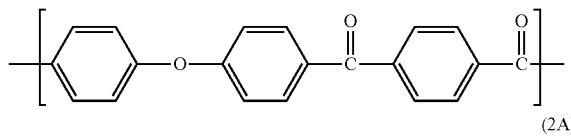

(1A)

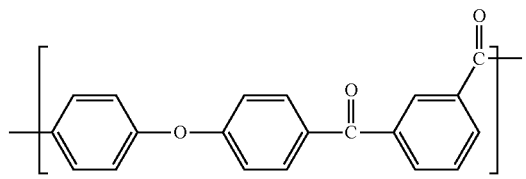

(2A)

24 Claims, No Drawings

RESIN COMPOSITION, FILM, COMPOSITE MATERIAL, MOVING BODY, AND THREE-DIMENSIONAL PRINTING MATERIAL

TECHNICAL FIELD

The present invention relates to a super-engineering plastic resin composition applicable to insulation films, printed circuit boards, spacers, housings, surface materials, packaging materials, and the like in electrical and electronic devices, automobiles, aircraft, and the like. The present invention also relates to a film, a composite material, a moving body, a three-dimensional printing material, a three-dimensional printing filament, and a formed body each formed of the resin composition.

BACKGROUND ART

In recent years, super-engineering plastics, such as poly(ether imide sulfone) (PEI), poly(ether sulfone) (PES), poly(ether ether ketone) (PEEK), poly(ether ketone) (PEK), poly(ether ketone ketone) (PEKK), and poly(ether ether ketone ketone) (PEKEKK), have been widely used as films and three-dimensional printing materials for electrical and electronic devices, automobiles, aircraft, and other applications due to their good heat resistance, mechanical characteristics, chemical resistance, and durability.

In particular, poly(ether ketone ketone), which has a glass transition temperature and a crystal melting temperature that can be controlled by its primary structure, is expected to be used as a material with high heat resistance and melt formability mainly used as a matrix material for speaker diaphragms and fiber-reinforced materials. Poly(ether ketone ketone) has high adhesiveness to glass fibers and carbon fibers and can therefore exhibit good mechanical characteristics when used as a matrix resin for fiber-reinforced materials.

Poly(ether ketone ketone) has been required to have improved heat resistance to withstand more severe environments.

Patent Literature 1 discloses a multicomponent phase-separated polymer blend of poly(aryl ether ketone) and poly(ether imide sulfone) and discloses that the blend system can improve the heat resistance of the poly(aryl ether ketone).

CITATION LIST

Patent Literature

PTL 1: Japanese Unexamined Patent Application Publication (Translation of PCT Application) No. 2009-508997

SUMMARY OF INVENTION

In the course of making the present invention, the present inventors have found that the blend of poly(aryl ether ketone) and poly(ether imide sulfone) of Patent Literature 1 is phase-separated, is softened at the glass transition temperature of each component, and therefore has poor secondary processability.

Patent Literature 1 discloses that poly(ether ketone ketone) may be used as the poly(aryl ether ketone) but does not disclose any preferred ratio of repeating units constituting the resin, particularly a repeating unit derived from terephthalic acid and a repeating unit derived from isophthalic acid.

Patent Literature 1 also discloses many monomer components that can be used for the poly(ether imide sulfone) but does not disclose any structure that can exhibit good performance in combination with the poly(ether ketone ketone).

Accordingly, it is an object of the present invention to provide a resin composition with high heat resistance, melt formability, and secondary processability.

In the present invention, a poly(aryl ether ketone) resin (A) and a poly(ether imide sulfone) resin (B) are combined and compatibly mixed. This further improves the heat resistance of the poly(aryl ether ketone) resin (A) with high heat resistance and melt formability, and the compatible mixture provides a resin composition also with high secondary processability.

The present invention also provides a three-dimensional printing material with high heat resistance and good printing properties, which contains a poly(aryl ether ketone) resin (A) with a ratio of the number of ether groups to the number of ketone groups being less than 2 and a resin (A') other than the poly(aryl ether ketone) resin (A), wherein heat of crystallization ($\Delta Hc$) measured by differential scanning calorimetry ranges from 5 to 40 J/g, and the poly(aryl ether ketone) resin (A) and the resin (A') other than the resin (A) are compatibly mixed.

The compatible mixture of the poly(aryl ether ketone) resin (A) and the resin (A') other than the resin (A) has high secondary processability, and therefore a three-dimensional printing material with a highly uniform shape and size can be produced. It is also possible to produce a three-dimensional printing product with good appearance and mechanical properties, such as tensile strength.

The present invention provides the following [1] to [26].

[1] A resin composition comprising: a poly(aryl ether ketone) resin (A); and a poly(ether imide sulfone) resin (B), wherein the poly(aryl ether ketone) resin (A) and the poly(ether imide sulfone) resin (B) are compatibly mixed.

[2] The resin composition according to [1], wherein the poly(aryl ether ketone) resin (A) is a poly(ether ketone ketone) resin.

[3] The resin composition according to [1] or [2], wherein the poly(aryl ether ketone) resin (A) has a repeating unit (a-1) represented by the following general formula (1) and/or a repeating unit (a-2) represented by the following general formula (2):

[Chem. 1]

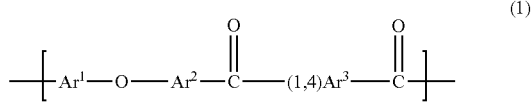

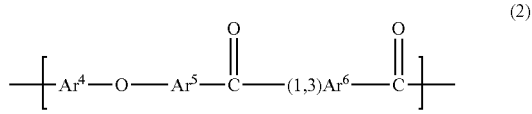

Wherein $Ar^1$ to $Ar^6$ in the general formulae (1) and (2) independently denote an optionally substituted arylene group having 6 to 24 carbon atoms, (1,4)$Ar^3$ in the general formula (1) is bonded to a ketone group at positions 1 and 4 of the $Ar^3$ group, and (1,3)$Ar^6$ in the general formula (2) is bonded to a ketone group at positions 1 and 3 of the $Ar^6$ group.

[4] The resin composition according to [3], wherein the poly(aryl ether ketone) resin (A) has a repeating unit (a-1) represented by the general formula (1) and a repeating unit (a-2) represented by the general formula (2), and a unit mole ratio [(a-1)/(a-2)] of the repeating unit (a-1) to the repeating unit (a-2) ranges from 1 to 5.

[5] The resin composition according to [3] or [4], wherein the repeating unit (a-1) represented by the general formula (1) is a repeating unit represented by the following structural formula (1A), and the repeating unit (a-2) represented by the general formula (2) is a repeating unit represented by the following structural formula (2A).

[Chem. 2]

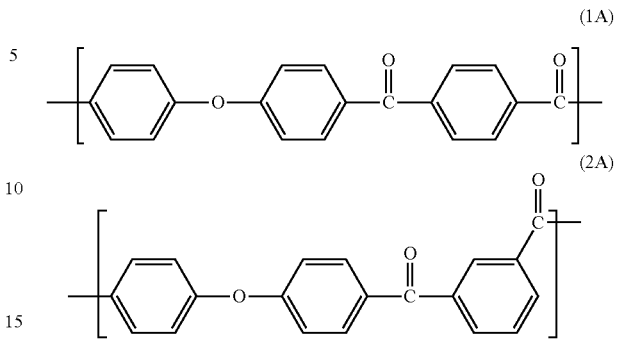

[6] The resin composition according to any one of [1] to [5], wherein the poly(ether imide sulfone) resin (B) has a repeating unit (b-1) represented by the following general formula (3):

[Chem. 3]

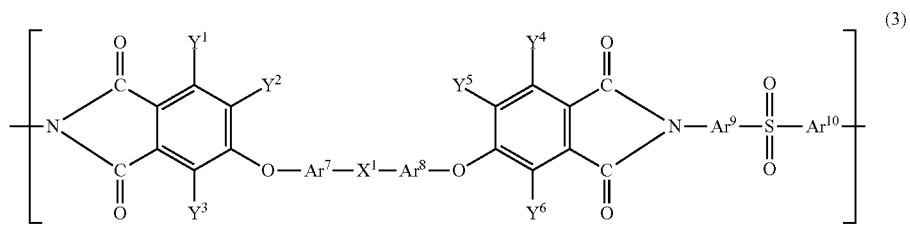

Wherein $Y^1$ to $Y^6$ independently denote a hydrogen atom, an alkyl group, or an alkoxy group, $Ar^7$ to $Ar^{10}$ independently denote an optionally substituted arylene group having 6 to 24 carbon atoms, and $X^1$ denotes a direct bond, a divalent aliphatic hydrocarbon group, —O—, —$SO_2$—, —S—, or —C(=O)—.

[7] The resin composition according to [6], wherein the repeating unit (b-1) represented by the general formula (3) is a repeating unit represented by the following structural formula (3A).

[Chem. 4]

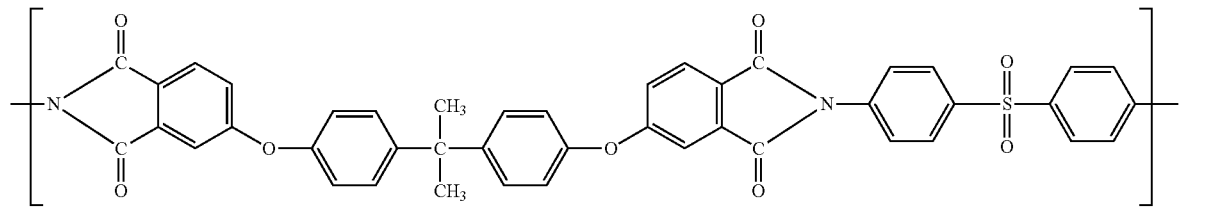

[8] The resin composition according to any one of [4] to [7], wherein the repeating unit (a-1) and the repeating unit (a-2) constituting the poly(aryl ether ketone) resin (A) have a unit mole ratio [(a-1)/(a-2)] in the range of 1 to 2, and the poly(ether imide sulfone) resin (B) has a repeating unit (b-2) represented by the following general formula (4):

[Chem. 5]

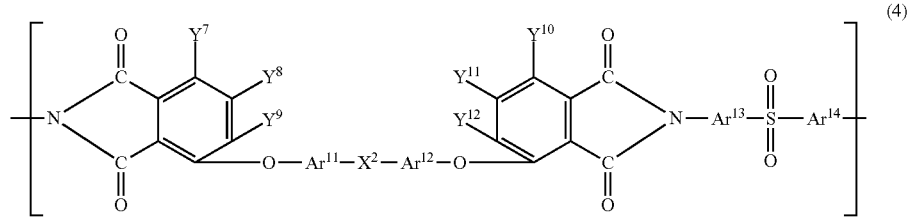

Wherein $Y^7$ to $Y^{12}$ independently denote a hydrogen atom, an alkyl group, or an alkoxy group, $Ar^{11}$ to $Ar^{14}$ independently denote an optionally substituted arylene group having 6 to 24 carbon atoms, and $X^2$ denotes a direct bond, a divalent aliphatic hydrocarbon group, —O—, —$SO_2$—, —S—, or —C(=O)—.

[9] The resin composition according to [8], wherein the repeating unit (b-2) represented by the general formula (4) is a repeating unit represented by the following structural formula (4A).

[Chem. 6]

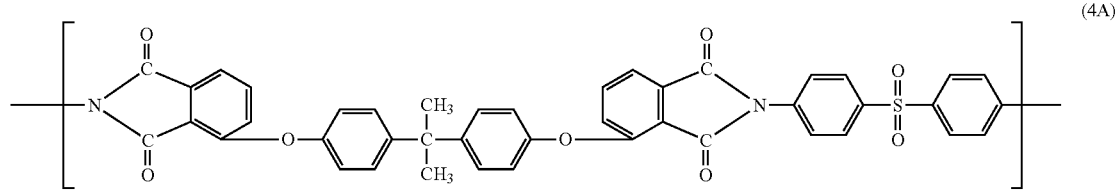

[10] The resin composition according to any one of [1] to [9], wherein a ratio of a poly(aryl ether ketone) resin (A) content to a poly(ether imide sulfone) resin (B) content ranges from 90:10 to 10:90 (% by mass) in 100% by mass of the poly(aryl ether ketone) resin (A) and the poly(ether imide sulfone) resin (B) in total.

[11] The resin composition according to any one of [1] to [10], wherein the resin composition has one glass transition temperature derived from the poly(aryl ether ketone) resin (A) and the poly(ether imide sulfone) resin (B).

[12] The resin composition according to [11], wherein the glass transition temperature ranges from 180° C. to 260° C.

[13] The resin composition according to [11] or [12], wherein a ratio E'(Tg−20° C.)/E'(Tg+20° C.) of tensile modulus E'(Tg−20° C.) at a temperature 20° C. below the glass transition temperature to tensile modulus E'(Tg+20° C.) at a temperature 20° C. above the glass transition temperature ranges from 100 to 1000.

[14] The resin composition according to any one of [1] to [13], wherein the resin composition has a melt viscosity in the range of 100 to 1000 Pa·s at 360° C. and at a shear rate of 1000 s$^{-1}$.

[15] A film comprising the resin composition according to any one of [1] to [14].

[16] A composite material comprising a combination of the resin composition according to any one of [1] to [14] or the film according to [15] and reinforcing fiber.

[17] The composite material according to [16], wherein the composite material is a prepreg or semipreg.

[18] A moving body, which is an aircraft, automobile, ship, or railway vehicle, comprising the composite material according to [16] or [17].

[19] A three-dimensional printing material comprising the resin composition according to any one of [1] to [14].

[20] A three-dimensional printing material comprising:
  a poly(aryl ether ketone) resin (A) with a ratio of the number of ether groups to the number of ketone groups being less than 2; and a resin (A') other than the poly(aryl ether ketone) resin (A),
  wherein heat of crystallization (ΔHc) measured by differential scanning calorimetry ranges from 5 to 40 J/g, and the poly(aryl ether ketone) resin (A) and the resin (A') other than the resin (A) are compatibly mixed.

[21] The three-dimensional printing material according to [20], wherein the resin (A') is at least one of poly(ether imide sulfone) (PEIS) (resin (B)) and poly(ether imide) (PEI) (resin (C)).

[22] A three-dimensional printing filament comprising the three-dimensional printing material according to any one of [19] to [21].

[23] The three-dimensional printing filament according to [22], wherein the filament has a diameter in the range of 1.0 to 5.0 mm.

[24] A roll of the three-dimensional printing filament according to [22] or [23].

[25] A three-dimensional printing cartridge comprising the three-dimensional printing filament according to [22] or [23] in a container.

[26] A formed body comprising the three-dimensional printing material according to any one of [19] to [21].

Advantageous Effects of Invention

The present invention can provide a resin composition with high heat resistance, melt formability, and secondary processability, and a film, a composite material, a moving body, a three-dimensional printing material, a three-dimensional printing filament, and a formed body each produced by using the resin composition.

The reason for the advantageous effects of a resin composition according to the present invention is not clear but may be as follows.

A resin composition produced by kneading a specific combination of a poly(ether ketone ketone) resin and a poly(ether imide sulfone) resin has one glass transition temperature higher than that of the poly(ether ketone ketone) resin alone and has a decreased melt viscosity, so that the resin composition probably has high heat resistance, melt formability, and secondary processability.

The reason for the advantageous effects of a three-dimensional printing material according to the present invention is not clear but may be as follows.

The use of a poly(ether ketone ketone) resin with a ratio of a chemically stable ether group to a ketone group, which imparts high heat resistance, optimum for three-dimensional printing and a reduction in the crystallinity of the poly(ether ketone ketone) resin reduce the crystallization shrinkage of a three-dimensional printing product. Thus, the resin composition probably has high heat resistance, melt formability, and secondary processability.

DESCRIPTION OF EMBODIMENTS

The present invention is described in detail below.

A resin composition according to the present invention contains a poly(aryl ether ketone) resin (A) and a poly(ether imide sulfone) resin (B), wherein the poly(aryl ether ketone) resin (A) and the poly(ether imide sulfone) resin (B) are compatibly mixed.

A three-dimensional printing material according to the present invention contains a poly(aryl ether ketone) resin (A) with the ratio of the number of ether groups to the number of ketone groups being less than 2 and a resin (A') other than the poly(aryl ether ketone) resin (A), wherein heat of crystallization (ΔHc) measured by differential scanning calorimetry ranges from 5 to 40 J/g, and the poly(aryl ether ketone) resin (A) and the resin (A') other than the resin (A) are compatibly mixed.

[Poly(Aryl Ether Ketone) Resin (A)]

The poly(aryl ether ketone) resin (A) for use in the present invention may be a resin having at least an aryl group, an ether group, and a ketone group as structural units.

Examples of the poly(aryl ether ketone) resin (A) include poly(ether ketone ketone) (PEKK), poly(ether ketone) (PEK), poly(ether ether ketone) (PEEK), poly(ether ketone ether ketone ketone) (PEKEKK), poly(aryl ether ketone ether ketone ketone) (PAEKEKK), poly(aryl ether ketone) (PAEK), poly(aryl ether ether ketone) (PAEEK), poly(ether ether ketone ketone) (PEEKK), poly(aryl ether ketone ketone) (PAEKK), and poly(aryl ether ether ketone ketone) (PAEEKK).

Among these, in terms of good mechanical characteristics, high thermal stability, and high melt formability, poly(ether ketone ketone) resins, poly(ether ketone) resins, poly(ether ether ketone) resins, poly(ether ketone ether ketone ketone) resins, and poly(ether ether ketone ketone) resins are preferred, poly(ether ketone ketone) resins and poly(ether ketone) resins are more preferred, and in terms of high thermal stability and melt formability poly(ether ketone ketone) resins and poly(ether ketone ketone) resins with a repeating unit (a-1) represented by the following general formula (1) and/or a repeating unit (a-2) represented by the following general formula (2) are preferred, and poly(ether ketone ketone) resins with the repeating unit (a-1) represented by the following general formula (1) and the repeating unit (a-2) represented by the following general formula (2) are more preferred. Each of the repeating units (a-1) and (a-2) particularly preferably has one ether group and two ketone groups.

In a three-dimensional printing material according to the present invention, among the poly(aryl ether ketone) resins (A), poly(aryl ether ketone) resins with the ratio of the number of ether groups to the number of ketone groups being less than 2 are used. Three-dimensional printing requires a longer heating time for shape processing than for film formation or injection molding, and voids are easily formed inside the formed product. Thus, the ratio of an ether group to a ketone group of a poly(aryl ether ketone) resin used for a three-dimensional printing material can be optimized to form a printing product with high heat resistance and chemical resistance.

[Chem. 7]

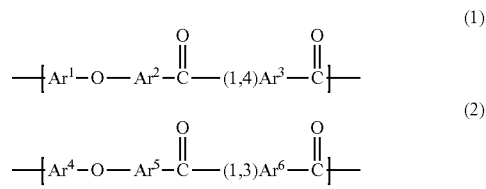

$Ar^1$ to $Ar^6$ in the general formulae (1) and (2) independently denote an optionally substituted arylene group having 6 to 24 carbon atoms. $(1,4)Ar^3$ in the general formula (1) is bonded to a ketone group at positions 1 and 4 of the $Ar^3$ group. $(1,3)Ar^6$ in the general formula (2) is bonded to a ketone group at positions 1 and 3 of the $Ar^6$ group.

The arylene groups of $Ar^1$ to $Ar^6$ in the general formulae (1) and (2) may be different but are preferably the same. More specifically, the arylene groups of $Ar^1$ to $Ar^6$ may be a phenylene group, a biphenylene group, or the like. Among these, a phenylene group is preferred, and $Ar^1$, $Ar^2$, $Ar^4$, and $Ar^5$ are preferably a p-phenylene group. $Ar^3$ is a p-arylene group, preferably a p-phenylene group. $Ar^6$ is a m-arylene group, preferably a m-phenylene group.

Examples of optional substituents of the arylene groups of $Ar^1$ to $Ar^6$ include alkyl groups having 1 to 20 carbon atoms, such as a methyl group and an ethyl group, and alkoxy groups having 1 to 20 carbon atoms, such as a methoxy group and an ethoxy group. $Ar^1$ to $Ar^6$ with a substituent may have any number of substituents.

In the poly(aryl ether ketone) resin (A), in terms of mechanical characteristics, thermal stability, and melt formability, the repeating unit (a-1) represented by the general formula (1) is preferably a repeating unit represented by the following structural formula (1A), and the repeating unit (a-2) represented by the general formula (2) is preferably a repeating unit represented by the following structural formula (2A).

[Chem. 8]

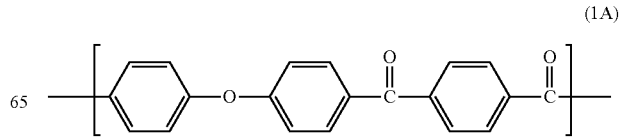

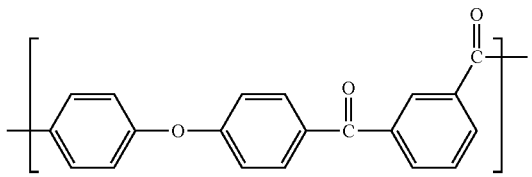

(2A)

The lower limit of the unit mole ratio [(a-1)/(a-2)] of the repeating unit (a-1) to the repeating unit (a-2) in the poly(aryl ether ketone) resin (A) is preferably 1 or more, more preferably 1.1 or more, still more preferably 1.2 or more, particularly preferably 1.3 or more, more particularly preferably 1.4 or more. When the unit mole ratio is 1 or more, the glass transition temperature is less likely to drop, and high heat resistance is easily maintained. The unit mole ratio [(a-1)/(a-2)] is preferably 5 or less, more preferably 4 or less, still more preferably 3 or less, particularly preferably 2 or less, more particularly preferably 1.7 or less, most preferably 1.5 or less. When the unit mole ratio is 5 or less, the glass transition temperature or crystal melting temperature is not too high, thus resulting in high melt formability, good thermal fusion properties when combined with reinforcing fiber, and good interlayer adhesion properties in three-dimensional printing.

As described later in detail, when the poly(ether imide sulfone) resin (B) blended with the poly(aryl ether ketone) resin (A) has a repeating unit (b-2) represented by the general formula (4) described later, and the unit mole ratio [(a-1)/(a-2)] ranges from 1 to 2, the poly(aryl ether ketone) resin (A) and the poly(ether imide sulfone) resin (B) are not phase-separated and tend to be compatible, thus resulting in high secondary processability.

The total number (the degree of polymerization) of the repeating units (a-1) and (a-2) in the poly(aryl ether ketone) resin (A) is preferably 10 or more, more preferably 20 or more, in terms of mechanical characteristics. The degree of polymerization is preferably 100 or less, more preferably 50 or less, in terms of melt formability.

Although the poly(aryl ether ketone) resin (A) may have a repeating unit other than the repeating unit (a-1) and the repeating unit (a-2), the ratio of the other repeating unit to the total of the repeating unit (a-1), the repeating unit (a-2), and the other repeating unit is 20% or less by mole, particularly 10% or less by mole, to ensure the effects of the repeating unit (a-1) and the repeating unit (a-2) in the poly(aryl ether ketone) resin (A). The poly(aryl ether ketone) resin (A) most preferably does not contain the other repeating unit.

The poly(aryl ether ketone) resin (A) preferably has a glass transition temperature of 150° C. or more, more preferably 153° C. or more, still more preferably 155° C. or more. A glass transition temperature equal to or higher than the lower limit tends to result in a resin composition with sufficient heat resistance. The poly(aryl ether ketone) resin (A) preferably has a glass transition temperature of 200° C. or less, more preferably 195° C. or less, still more preferably 190° C. or less, particularly preferably 185° C. or less, more particularly preferably 180° C. or less. A glass transition temperature equal to or lower than the upper limit results in high melt formability, easy thermal fusion at low temperatures when combined with reinforcing fiber, and easy interlayer adhesion in three-dimensional printing.

The poly(aryl ether ketone) resin (A) has different crystallinity depending on the unit mole ratio [(a-1)/(a-2)] of the repeating unit (a-1) to the repeating unit (a-2). For example, the poly(aryl ether ketone) resin (A) with a repeating unit represented by the structural formula (1A) and a repeating unit represented by the structural formula (2A) is typically crystalline at a unit mole ratio of 1.5 or more and amorphous at a mole ratio of less than 1.5. In the present invention, the poly(aryl ether ketone) resin (A) may be crystalline or amorphous. The crystalline poly(aryl ether ketone) resin (A) preferably has a crystal melting temperature of 280° C. or more, more preferably 285° C. or more, still more preferably 290° C. or more, particularly preferably 295° C. or more, more particularly preferably 300° C. or more. A crystal melting temperature equal to or higher than the lower limit tends to result in a resin composition with high heat resistance. The crystal melting temperature is preferably 400° C. or less, more preferably 380° C. or less, still more preferably 360° C. or less, particularly preferably 340° C. or less, more particularly preferably 335° C. or less. A crystal melting temperature equal to or lower than the upper limit results in high melt formability.

The heat of crystal melting of the poly(aryl ether ketone) resin (A) is preferably 60 J/g or less, more preferably 50 J/g or less, still more preferably 40 J/g or less, particularly preferably 30 J/g or less, more particularly preferably 26 J/g or less. A heat of crystal melting equal to or lower than the upper limit results in less crystallization and consequently less mold shrinkage or transparency loss due to crystallization, and tends to result in good thermal fusion properties when combined with reinforcing fiber and good interlayer adhesion properties in three-dimensional modeling. The heat of crystal melting is preferably 1 J/g or more, more preferably 2 J/g or more, still more preferably 3 J/g or more, particularly preferably 4 J/g or more, more particularly preferably 5 J/g or more. The heat resistance can be easily maintained at a heat of crystal melting equal to or higher than the lower limit.

The glass transition temperature in the present invention refers to a peak top temperature of a loss tangent (tan δ) peak in dynamic viscoelastic measurement according to JIS K 7244-4: 1999.

The crystal melting temperature and the heat of crystal melting are determined from a differential scanning calorimetry (DSC) curve detected while heating in a temperature range of 25° C. to 400° C. at a heating rate of 10° C./min using a differential scanning calorimeter in accordance with JIS K 7121: 2012 and JIS K 7122: 2012, respectively.

The same applies to the following.

The poly(aryl ether ketone) resin (A) can be produced by a known production method (see, for example, JP61-195122A, JP62-129313A, and U.S. Pat. No. 4,175,175, etc.).

The poly(aryl ether ketone) resin (A) may be a commercial product. Examples of commercial products of the poly(aryl ether ketone) resin (A) include commercial products of poly(ether ketone ketone) resin, such as "KEPSTAN" series manufactured by Arkema, "KSTONE" series manufactured by SHANDONG KAISHENG NEW MATERIALS, and "NovaSpire" series manufactured by SOLVAY. Examples of commercial products of the poly(ether ketone) resins include "VICTREX HT" series manufactured by Victrex plc. and "G-PAEK" series manufactured by Gharda Chemicals Ltd.

The poly(aryl ether ketone) resins (A) may be used alone or in combination.

[Resin (A') Other than Poly(Aryl Ether Ketone) Resin (A)]

The resin (A') other than the poly(aryl ether ketone) resin (A) used in a three-dimensional printing material according to the present invention is compatible with the poly(aryl ether ketone) resin (A).

Examples that can be used as the resin (A') include poly(ether imide sulfone) (PEIS) (poly(ether imide sulfone) resin (B)) and poly(ether imide) (PEI) (resin (C)). In particular, the use of the poly(ether imide sulfone) (PEIS) (poly(ether imide sulfone) resin (B)) as the resin (A') is preferred in terms of higher heat resistance.

[Poly(Ether Imide Sulfone) Resin (B)]

The poly(ether imide sulfone) resin (B) for use in the present invention may be, but is not limited to, a known resin and preferably has a repeating unit (b-1) represented by the following general formula (3) and/or a repeating unit (b-2) represented by the following general formula (4).

[Chem. 9]

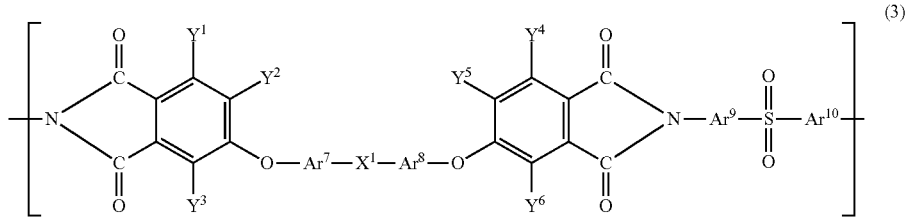

(3)

In the general formula (3), $Y^1$ to $Y^6$ independently denote a hydrogen atom, an alkyl group, or an alkoxy group. $Ar^7$ to $Ar^{10}$ independently denote an optionally substituted arylene group having 6 to 24 carbon atoms. $X^1$ denotes a direct bond, a divalent aliphatic hydrocarbon group, —O—, —SO$_2$—, —S—, or —C(=O)—.

[Chem. 10]

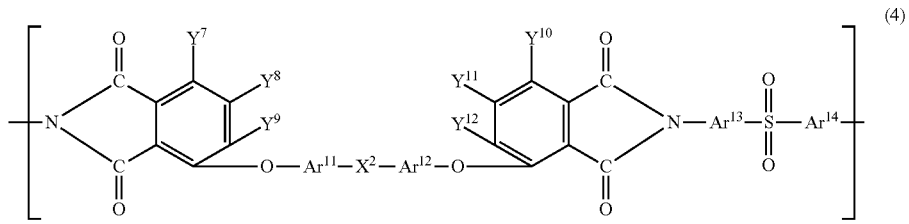

(4)

In the general formula (4), $Y^7$ to $Y^{12}$ independently denote a hydrogen atom, an alkyl group, or an alkoxy group. $Ar^{11}$ to $Ar^{14}$ independently denote an optionally substituted arylene group having 6 to 24 carbon atoms. $X^2$ denotes a direct bond, a divalent aliphatic hydrocarbon group, —O—, —SO$_2$—, —S—, or —C(=O)—.

The arylene groups of $Ar^7$ to $Ar^{10}$ in the general formula (3) may be different but are preferably the same. More specifically, the arylene groups of $Ar^7$ to $Ar^{10}$ may be a phenylene group, a biphenylene group, and the like. Among these, a phenylene group is preferred, and a p-phenylene group is preferred.

Examples of optional substituents of the arylene groups of $Ar^7$ to $Ar^{10}$ include alkyl groups having 1 to 20 carbon atoms, such as a methyl group and an ethyl group, and alkoxy groups having 1 to 20 carbon atoms, such as a methoxy group and an ethoxy group. $Ar^7$ to $Ar^{10}$ with a substituent may have any number of substituents.

The arylene groups of $Ar^{11}$ to $Ar^{14}$ in the general formula (4) may be different but are preferably the same. More specifically, the arylene groups of $Ar^{11}$ to $Ar^{14}$ may be a phenylene group, a biphenylene group, and the like. Among these, a phenylene group is preferred, and a p-phenylene group is preferred.

Examples of optional substituents of the arylene groups of $Ar^{11}$ to $Ar^{14}$ include alkyl groups having 1 to 20 carbon atoms, such as a methyl group and an ethyl group, and alkoxy groups having 1 to 20 carbon atoms, such as a methoxy group and an ethoxy group. $Ar^{11}$ to $Ar^{14}$ with a substituent may have any number of substituents.

In terms of mechanical characteristics, thermal stability, melt formability, and compatibility with the poly(aryl ether ketone) resin (A), in the poly(ether imide sulfone) resin (B), the repeating unit (b-1) represented by the general formula (3) is preferably a repeating unit represented by the following structural formula (3A), and the repeating unit (b-2) represented by the general formula (4) is preferably a repeating unit represented by the following structural formula (4A).

[Chem. 11]

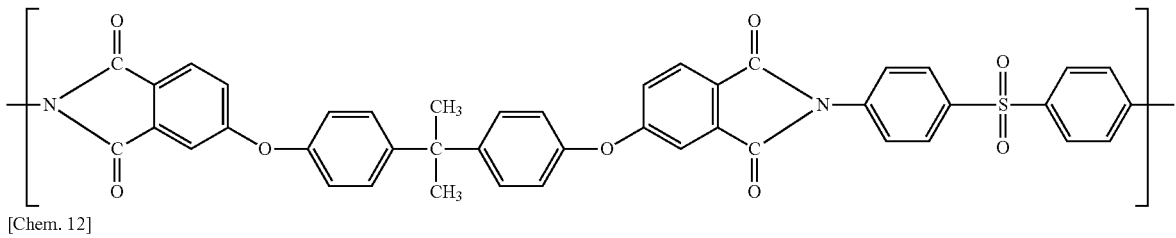

(3A)

[Chem. 12]

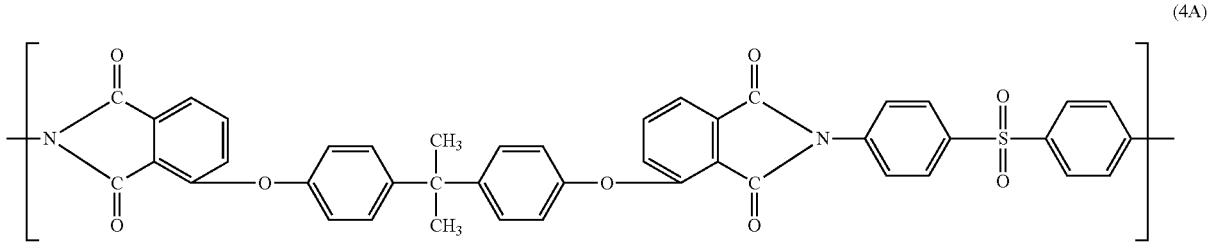

(4A)

In general, the structures of poly(ether imide sulfone) resins are classified in accordance with the binding mode. The poly(ether imide sulfone) resin (B) in a resin composition according to the present invention may be the poly(ether imide sulfone) resin (B) with the repeating unit (b-1) represented by the general formula (3), preferably the structural formula (3A), or the poly(ether imide sulfone) resin (B) with the repeating unit (b-2) represented by the general formula (4), preferably the structural formula (4A). The former is typically produced by using 2,2-bis[4-(3,4-dicarboxyphenoxy)phenyl]propane dianhydride and 4,4'-diaminodiphenyl sulfone as raw material monomers. The latter is typically produced by using 2,2-bis[4-(2,3-dicarboxyphenoxy)phenyl]propane dianhydride and 4,4'-diaminodiphenyl sulfone as raw material monomers.

The poly(ether imide sulfone) resin (B) with the repeating unit (b-1) represented by the general formula (3) is not phase-separated from or is compatible with the poly(aryl ether ketone) resin (A) over the entire composition, regardless of the unit mole ratio [(a-1)/(a-2)] of the poly(aryl ether ketone) resin (A). On the other hand, the poly(ether imide sulfone) resin (B) with the repeating unit (b-2) represented by the general formula (4) tends to be compatible with the poly(aryl ether ketone) resin (A) with a unit mole ratio [(a-1)/(a-2)] in the range of 1 to 2. In the present invention, the poly(aryl ether ketone) resin (A) and the poly(ether imide sulfone) resin (B) each with an optimum structure are selected to produce a resin composition or a three-dimensional printing material with high secondary processability without phase separation.

The total number (the degree of polymerization) of the repeating units (b-1) and/or the repeating units (b-2) in the poly(ether imide sulfone) resin (B) is preferably 10 or more, more preferably 20 or more, and preferably 1000 or less, more preferably 500 or less, in terms of a good balance between heat resistance and formability.

The poly(ether imide sulfone) resin (B) may have a repeating unit other than the repeating unit (b-1) and the repeating unit (b-2) without losing the advantages of the present invention. For example, the poly(ether imide sulfone) resin (B) may have a repeating unit derived from the following as a dianhydride of a raw material monomer.

A dianhydride selected from the group consisting of 4-(2,3-dicarboxyphenoxy)-4'-(3,4-dicarboxyphenoxy)diphenyl-2,2-propane dianhydride, 4-(2,3-dicarboxyphenoxy)-4'-(3,4-dicarboxyphenoxy)diphenyl ether dianhydride, 4-(2,3-dicarboxyphenoxy)-4'-(3,4-dicarboxyphenoxy)diphenyl sulfide dianhydride, 4-(2,3-dicarboxyphenoxy)-4'-(3,4-dicarboxyphenoxy)benzophenone dianhydride, 4-(2,3-dicarboxyphenoxy)-4'-(3,4-dicarboxyphenoxy)diphenyl sulfone dianhydride, 1,3-bis(2,3-dicarboxyphenoxy)benzene dianhydride, 1,4-bis(2,3-dicarboxyphenoxy)benzene dianhydride, 1,3-bis(3,4-dicarboxyphenoxy)benzene dianhydride, 1,4-bis(3,4-dicarboxyphenoxy)benzene dianhydride, cyclobutane tetracarboxylic dianhydride, cyclopentane tetracarboxylic dianhydride, cyclohexane-1,2,5,6-tetracarboxylic dianhydride, 2,3,5-tricarboxycyclopentylacetic acid dianhydride, 5-(2,5-dioxotetrahydrofuranyl)-3-methyl-3-cyclohexene-1,2-dicarboxylic acid dianhydride, 1,3,3a,5-dioxo-3-furanyl)-naphtho[1,2,-c]-furan-1,3-dione, 3,5,6-tricarboxynorbornane-2-acetic acid dianhydride, 2,3,4,5-tetrahydrofuran tetracarboxylic dianhydride, 3,3',4,4'-diphenyltetracarboxylic dianhydride, 3,3',4,4'-benzophenone tetracarboxylic dianhydride, naphthalic acid dianhydride (such as 2,3,6,7-naphthalic acid dianhydride), 3,3',4,4'-biphenyl sulfone tetracarboxylic dianhydride, 3,3',4,4'-biphenyl ether tetracarboxylic dianhydride, 3,3',4,4'-dimethyldiphenylsilane tetracarboxylic dianhydride, 4,4'-bis(3,4-dicarboxyphenoxy)diphenyl sulfide dianhydride, 4,4'-bis(3,4-dicarboxyphenoxy)diphenyl sulfone dianhydride, 4,4'-bis(3,4-dicarboxyphenoxy)diphenylpropane dianhydride, 3,3',4,4'-perfluoropyridine diphthalic acid dianhydride, 3,3',4,4'-biphenyltetracarboxylic dianhydride, bis(phthalic acid)phenyl sulfin oxide dianhydride, p-phenylene-bis(triphenylphthalic acid)dianhydride, m-phenylene-bis(triphenylphthalic acid)dianhydride, bis(triphenylphthalic acid)-4,4'-diphenyl ether dianhydride, bis(triphenylphthalic acid)-4,4'-diphenylmethane dianhydride, 2,2'-bis-(3,4-dicarboxyphenyl)hexafluoro-propane dianhydride, 4,4'-oxydiphthalic acid anhydride, pyromellitic dianhydride, 3,3',4,4'-diphenyl sulfone tetracarboxylic dianhydride, 4,4'-bisphenol A dianhydride, hydroquinone diphthalic acid anhydride, ethylene glycol bistrimellitic acid anhydride, 6,6'-bis(3,4-dicarboxyphenoxy)-2,2',3,3'-tetrahydro-3,3,3',3'-tetramethyl-1,1'-spirobi[1H-indene]dianhydride, 7,7'-bis(3,4-dicarboxyphenoxy)-3,3',4,4'-tetrahydro-4,4,4',4'-tetramethyl-2,2'-spirobi[2H-1-benzopyran]dianhydride, 1,1'-bis[1-(3,4-dicarboxyphenoxy)-2-methyl-4-phenyl]cyclohexane dianhydride, 3,3',4,4'-diphenyl sulfone tetracarboxylic dianhydride, 3,3',4,4'-diphenyl sulfide tetracarboxylic dianhydride, 3,3',4,4'-diphenyl sulfoxide tetracarboxylic dianhydride, 4,4'-oxydiphthalic acid anhydride, 3,3'-benzophenone tetracarboxylic dianhydride, 4,4'-carbonyldiphthalic acid anhydride, 3,3',4,4'-diphenylmethane tetracarboxylic dianhydride, 2,2-bis(4-(3,3-dicarboxyphenyl)propane dianhydride, 2,2-bis(4-(3,3-dicarboxyphenyl)hexafluoropropane dianhydride, (3,3',4,4'-diphenyl)phenylphosphine tetracarboxylic dianhydride, (3,3',4,4'-diphenyl)phenylphosphine oxide tetracarboxylic dianhydride, 2,2'-dichloro-3,3',4,4'-biphenyltetracarboxylic dianhydride, 2,2'-dimethyl 3,3',4,4'-biphenyltetracarboxylic dianhydride, 2,2'-dicyano-3,3',4,4'-biphenyltetracarboxylic dianhydride, 2,2'-dibromo-3,3',4,4'-biphenyltetracarboxylic dianhydride, 2,2'-diiodo-3,3',4,4'-biphenyltetracarboxylic dianhydride, 2,2'-ditrifluoromethyl-3,3',4,4'-biphenyltetracarboxylic dianhydride, 2,2'-bis(1-methyl-4-phenyl)-3,3',4,4'-biphenyltetracarboxylic dianhydride, 2,2'-bis(1-trifluoromethyl-2-phenyl-3,3',4,4'-biphenyltetracarboxylic dianhydride, 2,2'-bis(1-trifluoromethyl-3-phenyl)-3,3',4,4'-biphenyltetracarboxylic dianhydride, 2,2'-bis(1-trifluoromethyl-4-phenyl)-3,3',4,4'-biphenyltetracarboxylic dianhydride, 2,2'-bis(1-phenyl-4-phenyl)-3,3',4,4'-biphenyltetracarboxylic dianhydride, 2,2'-bis(1,3-trifluoromethyl-4-phenyl)-3,3',4,4'-biphenyltetracarboxylic dianhydride, and 5,5'-[[1,1'-biphenyl]-4,4'-diylbis(oxy)]bis[1,3-isobenzofurandione], and all isomers thereof, and mixtures and blends containing at least one thereof.

When the poly(ether imide sulfone) resin (B) has another repeating unit other than the repeating units (b-1) and (b-2), the other repeating unit is preferably 20% or less by mole, particularly preferably 10% or less by mole, of the total of the repeating unit (b-1), the repeating unit (b-2), and the other repeating unit, to maintain mechanical characteristics, thermal stability, melt formability, and compatibility with the poly(aryl ether ketone) resin (A).

The poly(ether imide sulfone) resin (B) preferably has a glass transition temperature of 230° C. or more, more preferably 240° C. or more, still more preferably 250° C. or more, particularly preferably 255° C. or more, more particularly preferably 260° C. or more. A glass transition temperature equal to or higher than the lower limit tends to result in high heat resistance. The poly(ether imide sulfone) resin (B) preferably has a glass transition temperature of 310° C. or less, more preferably 300° C. or less, still more preferably 295° C. or less, particularly preferably 290° C. or less, more particularly preferably 285° C. or less. A glass transition temperature equal to or lower than the upper limit tends to result in high melt formability.

The heat of crystal melting of the poly(ether imide sulfone) resin (B) is preferably 10 J/g or less, more preferably 5 J/g or less, still more preferably 0 J/g, that is, substantially amorphous. A heat of crystal melting equal to or lower than the upper limit tends to result in less crystallization of a resin composition or a three-dimensional printing material according to the present invention and consequently less mold shrinkage or transparency loss due to crystallization.

The poly(ether imide sulfone) resin (B) can be produced by a known production method.

The poly(ether imide sulfone) resin (B) may be a commercial product. A commercial product of the poly(ether imide sulfone) resin (B) is "EXTEM" series manufactured by SABIC Innovative Plastics, for example.

The poly(ether imide sulfone) resins (B) may be used alone or in combination.

[Poly(Ether Imide) Resin (C)]

The poly(ether imide) resin (C) for use in the present invention has a repeating unit (c-1) represented by the following structural formula (5).

[Chem. 13]

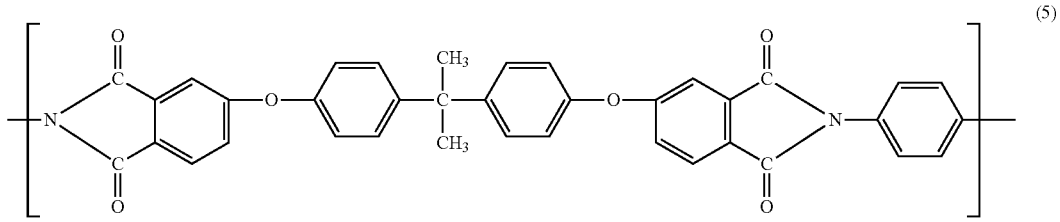

(5)

In general, the structures of poly(ether imide) resins are classified in accordance with the difference in binding mode, that is, the difference between meta binding and para binding. As is clear from the repeating unit (c-1) represented by the structural formula (5), the binding position of the imide group of the poly(ether imide) resin (C) for use in the present invention is a para position.

On the other hand, the binding position of an imide group with a repeating unit (c-2) represented by the following structural formula (6) may be a meta position.

[Chem. 14]

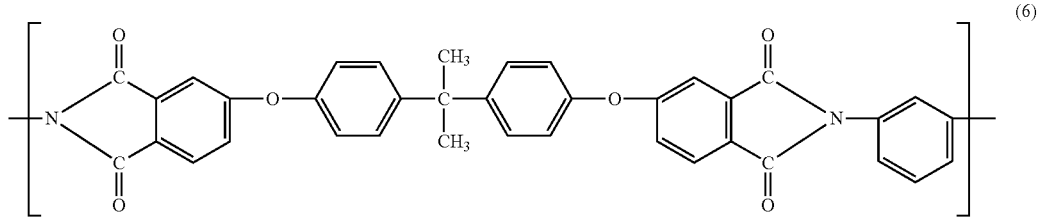

(6)

In the present invention, the use of a resin with the repeating unit (c-1) represented by the structural formula (5), particularly a resin composed only of the repeating unit (c-1), as the poly(ether imide) resin (C) can improve rigidity, heat resistance, and chemical resistance, and provide high impact resistance, particularly high impact resistance at low temperatures.

The total number (the degree of polymerization) of the repeating units (c-1) in the poly(ether imide) resin (C) is preferably 10 or more, more preferably 20 or more, in terms of a good balance between heat resistance and formability. The total number (the degree of polymerization) of the repeating units (c-1) in the poly(ether imide) resin (C) is preferably 1000 or less, more preferably 500 or less.

The poly(ether imide) resin (C) may have a repeating unit other than the repeating unit (c-1) without losing the advantages of the present invention. For example, the poly(ether imide) resin (C) may have the repeating unit (c-2) represented by the structural formula (6), and the repeating unit (c-2) content is preferably 20% or less by mole, more preferably 10% or less by mole, of all the repeating units in terms of impact resistance, heat resistance, and chemical resistance.

The poly(ether imide) resin (C) preferably has a glass transition temperature of 160° C. or more, more preferably 180° C. or more, still more preferably 200° C. or more. A glass transition temperature equal to or higher than the lower limit results in a resin composition or a three-dimensional printing material with sufficient heat resistance. The upper limit of the glass transition temperature is preferably 250° C., more preferably 240° C., in terms of thermal fusion at low temperatures and melt formability.

The heat of crystal melting of the poly(ether imide) resin (C) is preferably 10 J/g or less, more preferably 5 J/g or less, still more preferably 0 J/g, that is, substantially amorphous. A heat of crystal melting equal to or lower than the upper limit tends to result in lower crystallinity of a resin composition or a three-dimensional printing material according to the present invention and consequently good thermal fusion properties in secondary processing.

The poly(ether imide) resin (C) can be produced by a known production method (see, for example, U.S. Pat. Nos. 3,803,085 and 3,905,942).

The poly(ether imide) resin (C) may be a commercial product. A commercial product of the poly(ether imide) resin (C) is "Ultem" series manufactured by SABIC Innovative Plastics, for example.

The poly(ether imide) resins (C) may be used alone or in combination.

[Resin Composition and Three-Dimensional Printing Material]

A resin composition according to the present invention contains the poly(aryl ether ketone) resin (A) and the resin (A') other than the poly(aryl ether ketone) resin (A), for example, the poly(ether imide sulfone) resin (B). A resin composition containing the poly(aryl ether ketone) resin (A) has high melt formability, high heat resistance, and good mechanical characteristics. The poly(aryl ether ketone) resin (A) containing the poly(ether imide sulfone) resin (B) can have further improved heat resistance.

A resin composition according to the present invention is described below together with a resin composition in which the poly(ether imide sulfone) resin (B) is used as an example of the resin (A') other than the poly(aryl ether ketone) resin (A) in a three-dimensional printing material according to the present invention.

In the following description, "a resin composition according to the present invention" is interchangeable with "a three-dimensional printing material according to the present invention".

"The poly(ether imide sulfone) resin (B)" is interchangeable with "the resin (A')", "the poly(ether imide) resin (C)", or "the poly(ether imide sulfone) resin (B) and the poly (ether imide) resin (C)".

In a resin composition according to the present invention, it is important that the poly(aryl ether ketone) resin (A) and the poly(ether imide sulfone) resin (B) are compatible. The term "compatible", as used herein, means that the glass transition temperature derived from the poly(aryl ether ketone) resin (A) and the poly(ether imide sulfone) resin (B) is one in dynamic viscoelastic measurement, that is, the loss tangent (tan δ) derived from the poly(aryl ether ketone) resin (A) and the poly(ether imide sulfone) resin (B) has one peak, or the formation of a periodic structure or a dispersed structure cannot be observed with an electron microscope (for example, at a magnification of 3000 to 30,000). In particular, it is important that the glass transition temperature is one.

One glass transition temperature means that all the resin components constituting the resin composition are completely compatible and are not phase-separated. On the other hand, two or more glass transition temperatures mean incompatible or partially compatible and phase-separated. The glass transition temperature of the resin composition can be evaluated by reading a loss tangent (tan δ) peak in dynamic viscoelastic measurement according to JIS K 7244-4: 1999. More specifically, a single tan δ peak means a single glass transition temperature and no phase separation, and a plurality of tan δ peaks mean a plurality of glass transition temperatures and phase separation.

A phase-separated resin component constituting the resin composition results in poor secondary processability due to a plurality of glass transition temperatures. More specifically, at a processing temperature adjusted for a resin with a low glass transition temperature, a resin with a high glass transition temperature has a high elastic modulus and causes a problem, such as difficulty in shaping. On the other hand, at a processing temperature adjusted for a resin with a high glass transition temperature, a resin with a lower glass transition temperature changes in dimensions before reaching that temperature and causes a trouble, such as wrinkles or variations in thickness and wire diameter, due to shrinkage. The single peak may have a shoulder. Unless two or more peaks derived from the poly(aryl ether ketone) resin (A) and the poly(ether imide sulfone) resin (B) are clearly observed, all peaks mean compatible.

The poly(aryl ether ketone) resin (A) and the poly(ether imide sulfone) resin (B) constituting a resin composition according to the present invention are completely compatible and are not phase-separated. Thus, the resulting resin composition or a film or three-dimensional printing material produced by using the composition has high heat resistance and secondary processability.

The ratio of the poly(aryl ether ketone) resin (A) content to the poly(ether imide sulfone) resin (B) content in a resin composition according to the present invention preferably ranges from 90:10 to 10:90 (% by mass), more preferably 80:20 to 20:80 (% by mass), still more preferably 75:25 to 25:75 (% by mass), particularly preferably 70:30 to 30:70 (% by mass), in 100% by mass of the poly(aryl ether ketone) resin (A) and the poly(ether imide sulfone) resin (B) in total. When the ratio of the poly(aryl ether ketone) resin (A) content to the poly(ether imide sulfone) resin (B) content is in such a range, it is easy to achieve both heat resistance and melt formability.

[Another Component]

In addition to the poly(aryl ether ketone) resin (A) and the poly(ether imide sulfone) resin (B), a resin composition according to the present invention may contain a resin component other than the poly(aryl ether ketone) resin (A) and the poly(ether imide sulfone) resin (B) without losing the advantages of the present invention. When a resin composition according to the present invention contains another resin component, the other resin component content is preferably 30% or less by mass, more preferably 20% or less by mass, still more preferably 10% or less by mass, of the total resin components.

A resin composition according to the present invention may contain various additives, such as carbon fiber or another reinforcing fiber, a heat stabilizer, an antioxidant, an ultraviolet absorber, a light stabilizer, an antimicrobial and fungicide, an antistatic agent, a lubricant, a pigment, and/or a dye, without losing the advantages of the present invention. In particular, a resin composition according to the present invention may contain reinforcing fiber, and if present the reinforcing fiber content is preferably 10% or more by mass, more preferably 20% or more by mass, and preferably 90% or less by mass, more preferably 80% or less by mass, of the resin composition.

[Glass Transition Temperature]

The glass transition temperature derived from the poly (aryl ether ketone) resin (A) and the poly(ether imide sulfone) resin (B) in a resin composition according to the present invention is preferably 180° C. or more, more preferably 185° C. or more, still more preferably 190° C. or more, particularly preferably 195° C. or more, more particularly preferably 200° C. or more, as measured by reading a loss tangent (tan δ) peak in dynamic viscoelastic measurement according to JIS K 7244-4: 1999. The glass transition temperature is a measure of the heat resistance of a film or a three-dimensional printing product and can also be a measure of thermal fusion properties in secondary processing, for example, temporary bonding to reinforcing fiber, such as carbon fiber. A glass transition temperature equal to or higher than the lower limit tends to result in high heat resistance or good thermal fusion properties. The glass transition temperature is preferably 260° C. or less, more preferably 255° C. or less, still more preferably 250° C. or less, particularly preferably 245° C. or less, more particularly preferably 240° C. or less. A glass transition temperature equal to or lower than the upper limit tends to result in high melt formability.

[Crystal Melting Temperature]

When a resin composition according to the present invention has a crystal melting peak determined from a differential scanning calorimetry (DSC) curve detected while heating in the temperature range of 25° C. to 400° C. at a heating rate of 10° C./min using a differential scanning calorimeter in accordance with JIS K 7121: 2012, the crystal melting temperature of the peak top is preferably 280° C. or more, more preferably 285° C. or more, still more preferably 290° C. or more, particularly preferably 295° C. or more, more particularly preferably 300° C. or more. A crystal melting temperature equal to or higher than the lower limit tends to result in high heat resistance. The crystal melting temperature is preferably 370° C. or less, more preferably 360° C. or less, still more preferably 350° C. or less, particularly preferably 340° C. or less, more particularly preferably 330° C. or less. A crystal melting temperature equal to or lower than the upper limit results in high melt formability.

[Heat of Crystal Melting]

When a resin composition according to the present invention has a crystal melting peak determined from a differential scanning calorimetry (DSC) curve detected while heating in the temperature range of 25° C. to 400° C. at a heating rate of 10° C./min using a differential scanning calorimeter in accordance with JIS K 7122: 2012, the heat of crystal melting of the peak is preferably 25 J/g or less, more preferably 20 J/g or less, still more preferably 15 J/g or less, particularly preferably 10 J/g or less, more particularly preferably 5 J/g or less. A heat of crystal melting equal to or lower than the upper limit results in less crystallization and consequently less mold shrinkage or transparency loss due to crystallization. The lower limit of the heat of crystal melting is, but not limited to, 1 J/g or more, in terms of high heat resistance.

[Melt Viscosity]

The melt viscosity of a resin composition according to the present invention measured in accordance with JIS K 7199: 1999 at 360° C. and at a shear rate of 1000 $s^{-1}$ is preferably 100 Pa·s or more, more preferably 200 Pa·s or more, still more preferably 300 Pa·s or more, particularly preferably 400 Pa·s or more, more particularly preferably 500 Pa-s or more. A melt viscosity equal to or higher than the lower limit makes stable discharge easy, for example, in the formation of a film or in spinning a filament of a three-dimensional printing material. On the other hand, the melt viscosity is preferably 1000 Pa·s or less, more preferably 950 Pa·s or less, still more preferably 900 Pa·s or less, particularly preferably 850 Pa·s or less, more particularly preferably 800 Pa·s or less. A melt viscosity equal to or lower than the upper limit tends to result in high fluidity and improved productivity.

[Tensile Modulus Ratio at 20° C. Below and Above Glass Transition Temperature]

In a resin composition according to the present invention, the ratio E'(Tg−20° C.)/E'(Tg+20° C.) of tensile modulus E'(Tg−20° C.) at a temperature 20° C. below the glass transition temperature to tensile modulus E'(Tg+20° C.) at a temperature 20° C. above the glass transition temperature is preferably in a specific range. A high E'(Tg−20° C.)/E'(Tg+20° C.) means a large change in elastic modulus around the glass transition temperature. An excessively high ratio may result in a defect, such as wrinkles or strain, due to a too large dimensional change, for example, in shaping of a speaker diaphragm made of a film formed of a resin composition according to the present invention, in three-dimensional printing or in the production of a composite material by impregnating carbon fiber with a film formed of a resin composition according to the present invention. E'(Tg−20° C.)/E'(Tg+20° C.) is therefore preferably not too high. More specifically, E'(Tg−20° C.)/E'(Tg+20° C.) is preferably 1000 or less, more preferably 900 or less, still more preferably 800 or less, particularly preferably 700 or less, more particularly preferably 600 or less, most preferably 500 or less. On the other hand, a low E'(Tg−20° C.)/E'(Tg+20° C.) means a small change in elastic modulus around the glass transition temperature. When the ratio is too low, the temperature needs to be greatly increased to sufficiently deform or flow the resin, for example, in shaping of a speaker diaphragm made of a film formed of a resin composition according to the present invention, in three-dimensional printing or in the production of a composite material by impregnating carbon fiber with a film formed of a resin composition according to the present invention. This is unfavorable from the safety or economic point of view. From this perspective, E'(Tg−20° C.)/E'(Tg+20° C.) is preferably 100 or more, more preferably 150 or more, still more preferably 200 or more, particularly preferably 250 or more, more particularly preferably 300 or more, most preferably 350 or more.

When E'(Tg−20° C.)/E'(Tg+20° C.) is in the specific range, a resin composition according to the present invention has high secondary processability.

The tensile modulus of a resin composition according to the present invention is measured in accordance with JIS K 7127: 1999 by a method described later in the examples.

The tensile modulus of a resin composition according to the present invention at a temperature 20° C. below the glass transition temperature is preferably 1000 MPa or more, particularly preferably 1500 MPa or more. A tensile modulus equal to or higher than the lower limit results in sufficient rigidity easily achieved, for example, when a film or three-dimensional printing material produced by using a resin composition according to the present invention is used alone or when composited with another material, including reinforcing fiber, such as carbon fiber. In particular, sufficient rigidity facilitates the thickness reduction of the product, which can contribute to space saving and resource conservation. Furthermore, thinner films are advantageously easier to handle. A film or three-dimensional printing material oriented by a production method, for example, a film formed by extrusion preferably has a tensile modulus equal to or higher than the lower limit in the extrusion direction from the mold.

[Method for Producing Resin Composition]

A resin composition according to the present invention may be produced by any method, for example, by any known method for producing a thermoplastic resin composition. For example, components, such as the poly(aryl ether ketone) resin (A), the poly(ether imide sulfone) resin (B), and an optional additive agent, are mixed in advance in a mixer, such as a tumbler or a Henschel mixer, and are then melt-kneaded in a mixer, such as a Banbury mixer, a roller, a Brabender, a single-screw extruder, a twin-screw extruder, or a kneader. Among them, a melt-kneading method with a twin-screw extruder is preferred in terms of dispersibility of each component.

Furthermore, for example, a resin composition according to the present invention can also be produced by mixing some components (for example, an optional additive agent component) in advance, melt-kneading the mixture in an extruder to prepare a masterbatch, mixing the masterbatch with the remaining components, and melt-kneading the mixture.

The melt-kneading temperature is typically, but not limited to, 320° C. or more, preferably 330° C. or more, and typically 400° C. or less, preferably 380° C. or less.

A resin composition according to the present invention with one glass transition temperature derived from the poly(aryl ether ketone) resin (A) and the poly(ether imide sulfone) resin (B) is preferably produced, for example, by the following methods (1) to (5).

(1) The poly(aryl ether ketone) resin (A) and the poly(ether imide sulfone) resin (B) are selected in an appropriate combination. For example, as described above, the unit mole ratio [(a-1)/(a-2)] of the repeating unit (a-1) to the repeating unit (a-2) in the poly(aryl ether ketone) resin (A) is controlled for compatibility with the poly(ether imide sulfone) resin (B).

(2) Another resin compatible with both the poly(aryl ether ketone) resin (A) and the poly(ether imide sulfone) resin (B), for example, a resin with an imide group or a sulfonyl group is mixed. In particular, when the poly(aryl ether ketone) resin (A) has repeating units represented by the structural formula (1A) and the structural formula (2A), and the poly(ether imide sulfone) resin (B) has a repeating unit represented by the structural formula (3A) or the structural formula (4A), it is effective to use the poly(ether imide) resin (C) or a poly(biphenyl ether sulfone) (PPSU) as the other resin.

(3) The poly(aryl ether ketone) resin (A) and the poly(ether imide sulfone) resin (B) are sufficiently kneaded in a single- or twin-screw extruder, particularly in a twin-screw extruder for a combination of resins with poor compatibility. In particular, a twin-screw extruder is preferably used that has a screw with the ratio L/D of the length L (mm) to the diameter D (mm) being preferably 15 or more, more preferably 20 or more, and preferably 50 or less, more preferably 40 or less. The compatibility between the poly(aryl ether ketone) resin (A) and the poly(ether imide sulfone) resin (B) can be easily further improved at a ratio L/D of 15 or more. A ratio L/D of 50 or less tends to reduce the occurrence of discoloration, outgas, a gel-like foreign material, or the like associated with thermal degradation due to a long resin residence time or a too high resin temperature. The screw component of the extruder preferably includes a kneading unit, particularly a spiral kneading unit, to improve kneading performance. One or two kneading units are preferably used.

The resin temperature in melt-kneading is 320° C. or more, more preferably 330° C. or more, and preferably 400° C. or less, more preferably 380° C. or less, at the exit of the extruder. A resin temperature of 320° C. or more can result in more improved compatibility. A resin temperature of 400° C. or less is preferred to easily reduce discoloration of the resin composition and the occurrence of a burned foreign material.

The ratio Q/Ns of the discharge rate Q (kg/h) to the screw speed Ns (rpm) for melt-kneading is preferably 0.1 or more, more preferably 0.2 or more, and preferably 10 or less, more preferably 5 or less. A ratio Q/Ns in these ranges results in lower occurrence of discoloration of the resin composition and lower occurrence of a foreign material due to a too high resin temperature or a too long residence time and easily results in sufficient compatibility between the poly(aryl ether ketone) resin (A) and the poly(ether imide sulfone) resin (B).

A continuous kneader is also preferably used. The continuous kneader has a screw rotatably mounted in the cylinder of the extruder and provided with a plurality of rotating blades and also has a fixed blade inserted between the rotating blades in the cylinder. As the screw is rotated, a raw material moving along the screw shaft is kneaded by zigzagging through a gap between the rotating blades and the fixed blade from the central side to the outer peripheral side and then from the outer peripheral side to the central side. Thus, three operations of compression, shearing, and substitution can be efficiently applied to the raw material, and the dispersibility of each component can be improved more effectively than in a single- or twin-screw extruder. The blade may be of any shape, for example, a fan shape, a chrysanthemum shape, or a texture of a mortar. The continuous kneader may be "NES-KO series" manufactured by Chemical Engineering Co., Ltd., for example.

(4) The melting viscosities of the poly(aryl ether ketone) resin (A) and the poly(ether imide sulfone) resin (B) are made close to each other. More specifically, the difference between the melt viscosities at 360° C. and at a shear rate of 1000 s$^{-1}$ is preferably 1000 Pa·s or less. The melt viscosity can be controlled via the molecular weight or the branched structure.

(5) A compatibilizer is mixed to enhance compatibility.

[Method for Forming Resin Composition]

A resin composition according to the present invention can be formed by a typical forming method, such as extrusion, injection, blow, vacuum, air-pressure, or press forming. Any apparatus and processing conditions may be used in each forming method, and a known method may be used. In particular, in terms of processability to form a composite material described later, a resin composition according to the present invention is preferably formed into a film by extrusion or the like.

Furthermore, a resin composition according to the present invention can be formed into pellets or filaments preferably by extrusion or the like to form a three-dimensional printing material according to the present invention.

A film formed of a resin composition according to the present invention may also be a sheet. In general, a film refers to a thin flat product with a very small thickness relative to its length and width and with a limited maximum thickness and is typically supplied in the form of a roll (Japanese Industrial Standard JIS K 6900: 1994). In general, a sheet refers to a thin flat product with a small thickness relative to its length and width as defined by JIS. However, the boundary between sheets and films is not clear, and films include sheets in the present invention. A "film" may therefore be a "sheet".

[Method for Producing Film]

When a resin composition according to the present invention is used as a film, the film may be produced by any method and may be produced as an nonoriented or oriented film, for example. An nonoriented film is preferred in terms of secondary processability. Nonoriented films are films that are not intentionally stretched to reduce the orientation of the sheets and also include films with a stretch ratio of less than two in extrusion or the like using stretching rollers.

An nonoriented film can be produced, for example, by melt-kneading each constituent material as described above, followed by extrusion and cooling. A known kneader, such as a single- or twin-screw extruder, can be used for the melt-kneading. The melting temperature is appropriately adjusted according to the type and mixing ratio of the resin and the presence or absence and the type of an additive agent and is preferably 320° C. or more, more preferably 330° C. or more, in terms of productivity and less cross-linking or decomposition of the resin. The melting temperature is preferably 400° C. or less, more preferably 380° C. or less. A film can be formed by extrusion using a die, such as a T die, for example.

The cooling can be performed, for example, by bringing the film into contact with a cooling machine, such as a cooled casting roller, for rapid cooling. This solidifies the formed product and provides an nonoriented film. The cooling temperature (casting roller temperature) may be any temperature lower than the melting temperature and is preferably 260° C. or less, more preferably 250° C. or less, still more preferably 240° C. or less, particularly preferably 230° C. or less, more particularly preferably 220° C. or less. The cooling temperature (casting roller temperature) is preferably 120° C. or more, more preferably 130° C. or more, still more preferably 140° C. or more, particularly preferably 150° C. or more, more particularly preferably 160° C. or more. A cooling temperature in such a range tends to result in a film with a good appearance without wrinkles or sticking due to rapid cooling.

A film formed of a resin composition according to the present invention may have any thickness and preferably has a thickness of 1 μm or more, more preferably 3 μm or more, still more preferably 6 μm or more, particularly preferably 12 μm or more, more particularly preferably 20 μm or more, in terms of the strength, handleability, film-forming properties, secondary processability, and the like of the film. The film preferably has a thickness of 3 mm or less, more preferably 1 mm or less, still more preferably 500 μm or less, particularly preferably 300 μm or less, more particularly preferably 100 μm or less.

A film formed of a resin composition according to the present invention may be laminated with another layer to form a multilayer film without losing the advantages of the present invention. The multilayering method may be a known method, such as coextrusion, extrusion lamination, thermal lamination, or dry lamination.

[Applications and Usage]

A resin composition according to the present invention or a formed body, such as a film, formed of a resin composition according to the present invention can be used for a composite material and can also be used, for example, as a matrix of a fiber-reinforced plastic, which is a composite material with reinforcing fiber. The fiber-reinforced plastic has high heat resistance and mechanical characteristics.

Examples of the reinforcing fiber include, but are not limited to, inorganic fibers, such as carbon fiber, glass fiber, boron fiber, and alumina fiber, organic fibers, such as liquid crystal polymer fiber, polyethylene fiber, aramid fiber, and poly(p-phenylene)benzoxazole fiber, and metal fibers, such as aluminum fiber, magnesium fiber, titanium fiber, SUS fiber, and copper fiber. Among these, carbon fiber is preferred in terms of rigidity and light weight.

The reinforcing fiber may have any shape and may be appropriately selected as required from fiber bundles, such as chopped strand and roving, fabrics, such as plain weave and twill weave, knitted fabrics, nonwoven fabrics, fiber paper, and reinforcing fiber sheets, such as unidirectional materials (UD materials).

A resin composition according to the present invention may be combined with reinforcing fiber by any method, for example, by a known method. For example, when the poly(aryl ether ketone) resin (A) and the poly(ether imide sulfone) resin (B) are melt-kneaded, a composite material of the resin composition and reinforcing fiber can be produced by blending a chopped strand of the reinforcing fiber or by impregnating a continuous reinforcement fiber roving with a resin composition according to the present invention.

A film formed of a resin composition according to the present invention may be combined with reinforcing fiber by any method, for example, by a known method. For example, a reinforcing fiber bundle or a reinforcing fiber sheet can be impregnated or semi-impregnated with a resin composition according to the present invention to produce a composite material in a prepreg state or a semipreg state (a state in which voids exist).

More specifically, a film formed of a resin composition according to the present invention may be superimposed on one or both sides of the reinforcing fiber sheet, and heated and pressurized to melt the film, thereby impregnating the reinforcing fiber sheet with the resin component to form a prepreg state or a semipreg state. A prepreg or a semipreg in a semi-impregnation state (temporary bonding state) can be selected by adjusting the heating and pressurization conditions. A semipreg can also be formed by temporarily bonding a sheet formed of a resin composition according to the present invention to a reinforcing fiber sheet by thermal fusion without the pressurization process. The semipreg can advantageously decrease the production time and production costs and is semi-impregnated, which enables reinforcing fiber to move easily and be flexible in the semipreg.

In recent years, semipregs have attracted attention as precursors (intermediates) of fiber-reinforced plastics. As described above, a semipreg is typically formed by temporarily bonding a thermoplastic resin film by thermal fusion to reinforcing fiber in one direction or to both sides or one side of a reinforcing fiber sheet, such as a fabric sheet. A semipreg may be finally subjected to hot pressing or belt pressing to produce a fully impregnated prepreg or to directly produce a composite product. A resin film used to produce a semipreg should be able to thermally fuse with a reinforcing fiber sheet. A resin composition according to the present invention can be particularly suitably used in terms of good thermal fusion with reinforcing fiber and thermal fusion at lower temperatures while maintaining heat resistance.

The reinforcing fiber content of a composite material thus produced is preferably 20% or more by volume, more preferably 30% or more by volume, still more preferably 40% or more by volume. The reinforcing fiber content of the composite material is preferably 90% or less by volume, more preferably 80% or less by volume, still more preferably 70% or less by volume.

A composite material produced by combining a resin composition according to the present invention or a film formed of a resin composition according to the present invention with reinforcing fiber is industrially useful as a constituent of a moving body, such as an aircraft, an automobile, a ship, or a railway vehicle, in terms of heat resistance, light weight, mechanical strength, and the like.

[Heat of Crystallization of Three-Dimensional Printing Material]

When a resin composition according to the present invention is used as a three-dimensional printing material, it is important that the heat of crystallization ($\Delta Hc$) of the resin composition measured by differential scanning calorimetry at a cooling rate of 10° C./min ranges from 5 to 40 J/g. A heat of crystallization ($\Delta Hc$) in this range is preferred in terms of a good balance between printing properties as a three-dimensional printing material and the heat resistance of a formed body of the three-dimensional printing material. In terms of heat resistance, the lower limit of the heat of crystallization ($\Delta Hc$) of a three-dimensional printing material according to the present invention is 5 J/g or more, preferably 10 J/g or more, more preferably 15 J/g or more, still more preferably 18 J/g or more. In terms of printing properties (prevention of warping), the upper limit of the heat of crystallization ($\Delta Hc$) of a three-dimensional printing material according to the present invention is 40 J/g or less, preferably 35 J/g, more preferably 32 J/g or less, particularly preferably 30 J/g or less.

[Method for Producing Three-Dimensional Printing Material]

When a resin composition according to the present invention is used as a three-dimensional printing material, the three-dimensional printing material may be produced by any method and may be produced as a filament, pellets, or a powder, for example. A filament is preferred in terms of handleability.

Pellets can be produced, for example, by melt-kneading each constituent material as described above, followed by extrusion, pelletizing while maintaining certain dimensions and shape, and cooling. A known kneader, such as a single- or twin-screw extruder, can be used for the melt-kneading. When an extruder is used, the ratio (L/D) between the screw length (L) and the screw diameter (D) of the extruder is preferably, but not limited to, in the range of 20 to 80, preferably 25 to 70, more preferably 30 to 60, particularly preferably 35 to 50, in terms of the mutual dispersibility of the poly(aryl ether ketone) resin (A) and the poly(ether imide sulfone) resin (B). The extruder is preferably a twin-screw extruder.

The powder may be produced by melt granulation, in which a resin composition according to the present invention is melted near the melting point, is formed into a fiber, and is cut into the powder, or by pulverization, in which a resin material composed of a resin composition according to the present invention is cut or broken by impacts or shearing. To improve the coating performance of the powder in three-dimensional printing, the powder is preferably round, that is, has a high degree of circularity. Thus, a pulverization method suitable for a resin composition according to the present invention is preferably determined to produce a powder with such a suitable shape.

The pulverization means may be a stamp mill, a ring mill, a stone mill, a mortar, a roller mill, a jet mill, a tumbling mill, a hammer mill, a pin mill, a container driven mill, a disk mill, or a medium stirring mill.

To prevent the drawing of a resin material due to shear heating during the pulverization, the powder system may be cooled with liquid nitrogen or the like to decrease the resin temperature during the pulverization, thereby producing the powder by brittle fracture rather than ductile fracture.

A classification process is preferably performed after the pulverization to remove a drawn powder from the pulverized powder and increase the circularity. The classification may be air classification or sieve classification.

The amount of a resin composition according to the present invention in a three-dimensional printing material preferably ranges from 50% to 100% by mass, more preferably from 80% to 100% by mass, particularly preferably from 95% to 100% by mass, in terms of the balance between printing properties and heat resistance and in terms of interlayer adhesion properties. A three-dimensional printing material is more particularly preferably composed of a resin composition according to the present invention.

A three-dimensional printing material according to the present invention may contain a component other than resin compositions composed of the poly(aryl ether ketone) resin (A) and the poly(ether imide sulfone) resin (B) without losing the advantages of the present invention. Examples of the component other than the resin compositions include polymers other than the poly(aryl ether ketone) resin (A) and the poly(ether imide sulfone) resin (B), heat-resistant agents, ultraviolet absorbers, light stabilizers, antioxidants, antistatic agents, lubricants, slip agents, nucleating agents, tackifiers, sealing improving agents, anti-fogging agents, release agents, plasticizers, pigments, dyes, perfumes, flame retardants, organic particles, inorganic particles, and reinforcing materials.

The water content of a three-dimensional printing material according to the present invention is preferably 2.5% or less by mass. The water content is more preferably 2.0% or less by mass, still more preferably 1.5% or less by mass, particularly preferably 1.0% or less by mass. The water content may be 0.3% or more by mass or 0.6% or more by mass. A water content in such a range is preferred in terms of less foaming or smoking during extrusion and a modeling product with stable dimensions and mechanical strength. The water content of a three-dimensional printing material is measured by a Karl Fischer method.

Thus, a three-dimensional printing material according to the present invention, as well as a three-dimensional printing filament described later, is preferably dried after production and is stored in a moisture-proof packaging material (an aluminum bag, a deposited film, a glass vessel, or the like).

[Three-Dimensional Printing Filament]

A three-dimensional printing filament according to the present invention is produced by using a three-dimensional printing material containing a poly(aryl ether ketone) resin (A) with the ratio of the number of ether groups to the number of ketone groups being less than 2 and a resin (A') other than the poly(aryl ether ketone) resin (A).

A three-dimensional printing filament according to the present invention may be produced by any method, for example, by forming the three-dimensional printing material typically by a known forming method, such as extrusion, or by directly forming the filament while a resin composition is produced. When a three-dimensional printing filament according to the present invention is produced by extrusion, the temperature is appropriately adjusted according to the flow characteristics and forming processability of a resin composition to be used and typically ranges from 300° C. to 400° C., preferably 320° C. to 380° C.

[Physical Properties and the Like of Three-Dimensional Printing Filament]

The diameter of a three-dimensional printing filament according to the present invention depends on the specifications of the system used to form a resin formed body by a fused deposition modeling process and is typically 1.0 mm or more, preferably 1.5 mm or more, more preferably 1.6 mm or more, particularly preferably 1.7 mm or more. The upper limit of the diameter is typically 5.0 mm or less, preferably 4.0 mm or less, more preferably 3.5 mm or less, particularly preferably 3.0 mm or less.

The precision of the filament diameter is preferably within ±5% at any point of measurement of the filament in terms of the stability of the raw material supply. In particular, the standard deviation of the diameter of a three-dimensional printing filament according to the present invention is preferably 0.07 mm or less, particularly preferably 0.06 mm or less.

The circularity of a three-dimensional printing filament according to the present invention is preferably 0.93 or more, particularly preferably 0.95 or more. The upper limit of the circularity is 1.0.

The circularity of a three-dimensional printing filament is measured by the following method.

<Circularity>

The maximum diameter and the minimum diameter of a filament are measured with a vernier caliper at predetermined intervals, for example, at intervals of 3 cm, and the ratio of the minimum diameter/maximum diameter at each point of measurement is determined. The average of the minimum diameter/maximum diameter ratios at the points of measurement is defined as the circularity. A ratio closer to 1.0 indicates a filament with a cross-section closer to a perfect circle.

When a three-dimensional printing filament has a diameter with a small standard deviation and has a high circularity, it is possible to reduce variations in discharge while forming and stably produce a formed body with good appearance, surface properties, and the like A three-dimensional printing material according to the present invention can be used to relatively easily produce a three-dimensional printing filament that satisfies such a standard deviation and circularity.

[Roll of Three-Dimensional Printing Filament and Three-Dimensional Printing Cartridge]

To produce a formed body by three-dimensional printing using a three-dimensional printing filament according to the present invention, it is required to stably preserve the three-dimensional printing filament and stably supply the three-dimensional printing filament to three-dimensional printing. Thus, a three-dimensional printing filament according to the present invention is preferably hermetically packaged as a roll (wound body) wound around a bobbin, or the wound body is housed in a three-dimensional printing cartridge (hereinafter sometimes referred to simply as a "cartridge") in terms of long-term storage, stable feed, protection from environmental factors, such as moisture, and prevention of twisting. The cartridge may include a wound body (roll) wound around a bobbin and a vapor barrier or a moisture absorbent and may be hermetically sealed except for at least an orifice through which a three-dimensional printing filament is fed.

A roll (wound body) of a three-dimensional printing filament wound around a bobbin or a cartridge containing the wound body is typically installed in or around a three-dimensional printer, and the three-dimensional printing filament is continuously introduced from the cartridge into the three-dimensional printer while forming.

[Formed Body Composed of Three-Dimensional Printing Material]

A formed body according to the present invention (hereinafter referred to simply as a "formed body") formed of a three-dimensional printing material according to the present invention can be produced by forming a three-dimensional printing filament according to the present invention with a three-dimensional printer. Examples of the forming method using a three-dimensional printer include a fused deposition modeling process (an ME process), a powder sintering process, an ink jet process, and a stereolithography process (an SLA process). A three-dimensional printing filament according to the present invention can be suitably used for the fused deposition modeling process or the powder sintering process, particularly preferably for the fused deposition modeling process, among these. The fused deposition modeling process is described below as an example.

A three-dimensional printer typically has a chamber and includes a raw material supply portion, including a heatable base, an extrusion head mounted on a gantry structure, a heating melter, a filament guide, a filament cartridge installation portion, and the like, in the chamber. In some three-dimensional printers, an extrusion head and a heating melter are integrated.

The extrusion head mounted on the gantry structure can be freely moved on the X-Y plane of the base. The base is a platform on which a desired three-dimensional object, a supporting material, and the like are placed and is preferably specified to adhere to a laminate by heating and insulation and to improve the dimensional stability of a formed body as a desired three-dimensional object. To improve adhesiveness to a laminate, adhesive glue may be applied to the base, or a sheet or the like with high adhesiveness to a laminate may be attached to the base. The sheet with high adhesiveness to a laminate may be a sheet with fine asperities on the surface, such as an inorganic fiber sheet, or a sheet formed of the same type of resin as the laminate. At least one of the extrusion head and the base is typically movable in the Z-axis direction perpendicular to the X-Y plane.

A three-dimensional printing filament is fed from the raw material supply portion, is fed to the extrusion head by a pair of opposed rollers or gears, is heat-melted by the extrusion head, and is extruded from a tip nozzle. Receiving a signal transmitted on the basis of a CAD model, the extrusion head moves and simultaneously deposits the raw material on the base. After completion of this process, the layered deposit is removed from the base. If necessary, the supporting material and the like are separated, and unnecessary portions are removed. Thus, a formed body can be produced as a desired three-dimensional object.

The raw material may be continuously supplied to the extrusion head by feeding a filament or fiber, by feeding a powder or liquid from a tank or the like via a volumetric feeder, or by extruding a pellet or granule plasticized with an extruder or the like. Among these, in terms of simplicity of the process and supply stability, the method of feeding a filament, that is, the method of feeding a three-dimensional printing filament according to the present invention is most preferred.

A filament supplied to a three-dimensional printer is typically engaged with a drive roller, such as a nip roller or a gear roller, and is fed to an extrusion head. To further strengthen the holding by the engagement between the filament and the drive roller and thereby stabilize the supply of the raw material, it is also preferable to transfer fine asperities to the surface of the filament or to blend an inorganic additive agent, a spreading agent, an adhesive agent, rubber, or the like to increase frictional resistance to the engaging portion. A filament with an uneven thickness cannot be held by the engagement between the filament and the drive roller, and the drive roller idles, so that the filament may not be supplied to an extrusion head.

For a three-dimensional printing material containing the poly(aryl ether ketone) resin (A) with the ratio of the number of ether groups to the number of ketone groups being less than 2 and the resin (A') other than the poly(aryl ether ketone) resin (A) used in the present invention, the temperature at which the three-dimensional printing material has fluidity suitable for extrusion typically ranges from approximately 300° C. to 400° C. Thus, a formed body according to the present invention can typically be stably produced at a heating extrusion head temperature of 450° C. or less, preferably 350° C. to 400° C., and at a base temperature of 200° C. or less.

The temperature of molten resin discharged from an extrusion head (discharge temperature) is preferably 350° C. or more, more preferably 370° C. or more, and preferably 420° C. or less, more preferably 400° C. or less, still more preferably 380° C. or less. A temperature of molten resin equal to or higher than the lower limit is preferred in terms of extrusion of a resin with high heat resistance, high-speed discharging, and a tendency to improve printing efficiency. On the other hand, a temperature of molten resin equal to or lower than the upper limit is preferred because it is easy to prevent problems, such as thermal decomposition, burning, yellowing, smoking, malodor, and stickiness of the resin. This is also preferred to prevent poor appearance due to a fragment of thinly stretched molten resin called stringing or an agglomerate of excess resin called a lump adhering to the printing product.

Molten resin discharged from an extrusion head is preferably discharged as a strand with a diameter in the range of 0.01 to 1.0 mm, more preferably 0.02 to 0.5 mm. Molten resin discharged in such a shape is preferred because a CAD model tends to have high reproducibility.

In the production of a formed body from a three-dimensional printing filament using a three-dimensional printer, when strand-like molten resin discharged from an extrusion head is layered to form a body, an uneven portion (a streak or the like) may occur on the surface of the formed body due to insufficient adhesion between molten resin strand discharged earlier and a strand discharged thereon or due to variations in discharge. Such an uneven portion on the surface of the formed body sometimes not only causes poor appearance but also easily damages the formed body.

A three-dimensional printing filament according to the present invention has good adhesion between a molten resin strand discharged earlier and a strand discharged thereon. Furthermore, a three-dimensional printing filament according to the present invention has a high circularity and reduces variations in discharge while forming. Thus, a formed body with good appearance, surface properties, and the like can be stably produced.

While a molten resin strand discharged from an extrusion head of a three-dimensional printer is layered to form a body, a nozzle is moved to the next layering position without discharging molten resin. At this time, the molten resin discharge may not be completely stopped, and a fine resin fiber may remain like a string on the surface of the formed body. Such stringing may result in poor appearance of the formed body.

Having a diameter with a small standard deviation, a high circularity, an appropriate crystallization rate, and a high fracture strain, a three-dimensional printing filament according to the present invention can stably produce a formed body with good appearance, surface properties, and the like with less stringing.

When a molten resin strand discharged from an extrusion head of a three-dimensional printer is layered to form a body, the resin may adhere to a nozzle portion of the extrusion head and may be colored by heat, forming a black foreign material (a dark dot or a black streak). A formed body contaminated with such a foreign material may have poor appearance and is likely to be broken.

A three-dimensional printing filament according to the present invention has high heat resistance and is less likely to be colored by heat even when resin adheres to a nozzle portion. Thus, a formed body with a good appearance can be stably produced.

Depending on the use, a formed body according to the present invention may be heat-treated after printing to promote or complete crystallization.

[Use of Formed Body]

A formed body according to the present invention also has a good surface appearance, high heat resistance, and high durability.

A formed body according to the present invention may be used in any application and may be suitably used for stationery; toys; covers for mobile phones and smartphones; parts such as grips; educational materials, household electrical appliances, repair parts for office automation equipment, various parts for automobiles, motorcycles, and bicycles; materials for electrical and electronic devices, agricultural materials, gardening materials, fishing materials, civil engineering and construction materials, medical supplies, and the like.

EXAMPLES

Although the present invention is described in more detail below in the examples, the present invention is not limited to these examples.

[Raw Materials Used]

Table 1 shows the raw materials used in the following examples and comparative examples.

In Table 1, the ratio of the number of ether groups to the number of ketone groups in the poly(aryl ether ketone) resin (A) is referred to as a "functional group ratio [ether group/ketone group]".

TABLE 1

| Resin type | | Details |
| --- | --- | --- |
| Poly(aryl ether ketone) resin (A) | (A)-1 | "KEPSTAN 6002" manufactured by Arkema |
| | | A poly(ether ketone ketone) resin with a repeating unit (a-1) |
| | | represented by the structural formula (1 A) and a repeating unit (a-2) |
| | | represented by the structural formula (2 A) |
| | | Unit mole ratio [(a-1)/(a-2)] = 1.5 |
| | | Crystal melting temperature = 308° C. |
| | | Heat of crystal melting = 5 J/g |
| | | Glass transition temperature = 168° C. |
| | | Functional group ratio [ether group/ketone group] = 0.5 |
| | (A)-2 | "KEPSTAN 7002" manufactured by Arkema |
| | | A poly(ether ketone ketone) resin with a repeating unit (a-1) |
| | | represented by the structural formula (1 A) and a repeating unit (a-2) |
| | | represented by the structural formula (2 A) |
| | | Unit mole ratio [(a-1)/(a-2)] = 2.3 |
| | | Crystal melting temperature = 332° C. |
| | | Heat of crystal melting = 30 J/g |
| | | Glass transition temperature = 172° C. |
| | | Functional group ratio [ether group/ketone group] = 0.5 |
| | (A)-3 | "VICTREX HT G22" manufactured by Victrex plc. |
| | | Poly(ether ketone) resin |
| | | Crystal melting temperature = 375° C. |
| | | Heat of crystal melting = 60 J/g |
| | | Glass transition temperature = 180° C. |
| | | Functional group ratio [ether group/ketone group] = 1 |
| | (A)-4 | "VICTREX PEEK 381 G" manufactured by Victrex plc. |
| | | Poly(ether ketone) resin |
| | | Crystal melting temperature = 341° C. |
| | | Heat of crystal melting = 45 J/g |
| | | Glass transition temperature = 162° C. |
| | | Functional group ratio [ether group/ketone group] = 2 |
| Poly(ether imide sulfone) resin (B) | (B)-1 | "EXTEM XH1003" manufactured by SABIC Innovative Plastics |
| | | A poly(ether imide sulfone) resin with a repeating unit (b-1) |
| | | represented by the structural formula (3 A) |
| | | Amorphous |
| | | Glass transition temperature = 262° C. |
| | (B)-2 | "EXTEM VH1015" manufactured by SABIC Innovative Plastics |
| | | A poly(ether imide sulfone) resin with a repeating unit (b-2) |
| | | represented by the structural formula (4 A) |
| | | Amorphous |
| | | Glass transition temperature = 282° C. |
| Poly(ether imide) resin (C) | (C)-1 | "Ultem 1010-1000" manufactured by SABIC Innovative Plastics |
| | | A poly(ether imide) resin with a repeating unit (c-1) represented by the structural formula (5) |
| | | Amorphous |
| | | Glass transition temperature = 212° C. |

Examples and Comparative Examples Relating to Production of Film

[Production of Film]

In examples and comparative examples relating to the production of a film, a film was produced using the raw materials shown in Table 1 at the mixing ratios shown in Tables 2 and 3, as described below.

Example 1

(A)-1 and (B)-1 were dry-blended at a mass ratio of 80:20. The resin mixture was kneaded at 360° C. in a single-screw extruder with a cylinder diameter of 40 mm and was then extruded into a film using a T-die. The formed product was rapidly cooled with a casting roller at 170° C. to produce a film with a thickness of 100 μm.

Example 2

A film was prepared in the same manner as in Example 1 except that the mixing ratio of (A)-1 to (B)-1 was 60:40 and the casting roller temperature was 190° C.

Example 3

A film was prepared in the same manner as in Example 1 except that the mixing ratio of (A)-1 to (B)-1 was 40:60 and the casting roller temperature was 210° C.

Example 4

A film was prepared in the same manner as in Example 1 except that the mixing ratio of (A)-1 to (B)-1 was 20:80 and the casting roller temperature was 230° C.

Example 5

A film was prepared in the same manner as in Example 1 except that (A)-1 was replaced with (A)-2, and the mixing ratio of (A)-2 to (B)-1 was 80:20.

Example 6

A film was prepared in the same manner as in Example 1 except that (A)-1 was replaced with (A)-2, the mixing ratio of (A)-2 to (B)-1 was 60:40, and the casting roller temperature was 190° C.

Example 7

A film was prepared in the same manner as in Example 1 except that (A)-1 was replaced with (A)-2, the mixing ratio of (A)-2 to (B)-1 was 40:60, and the casting roller temperature was 210° C.

Example 8

A film was prepared in the same manner as in Example 1 except that (A)-1 was replaced with (A)-2, the mixing ratio of (A)-2 to (B)-1 was 20:80, and the casting roller temperature was 230° C.

Example 9

A film was prepared in the same manner as in Example 1 except that (B)-1 was replaced with (B)-2, and the mixing ratio of (A)-1 to (B)-2 was 80:20.

Example 10

A film was prepared in the same manner as in Example 1 except that (B)-1 was replaced with (B)-2, the mixing ratio of (A)-1 to (B)-2 was 60:40, and the casting roller temperature was 190° C.

Example 11

A film was prepared in the same manner as in Example 1 except that (B)-1 was replaced with (B)-2, the mixing ratio of (A)-1 to (B)-2 was 40:60, and the casting roller temperature was 210° C.

Example 12

A film was prepared in the same manner as in Example 1 except that (B)-1 was replaced with (B)-2, the mixing ratio of (A)-1 to (B)-2 was 20:80, and the casting roller temperature was 230° C.

Comparative Example 1

A film was prepared in the same manner as in Example 1 except that (A)-1 was replaced with (A)-2, (B)-1 was replaced with (B)-2, and the mixing ratio of (A)-2 to (B)-2 was 80:20.

Comparative Example 2

A film was prepared in the same manner as in Example 1 except that (A)-1 was replaced with (A)-2, (B)-1 was replaced with (B)-2, and the mixing ratio of (A)-2 to (B)-2 was 60:40.

Comparative Example 3

A film was prepared in the same manner as in Example 1 except that (A)-1 was replaced with (A)-2, (B)-1 was replaced with (B)-2, and the mixing ratio of (A)-2 to (B)-2 was 40:60.

Comparative Example 4

A film was prepared in the same manner as in Example 1 except that (A)-1 was replaced with (A)-2, (B)-1 was replaced with (B)-2, and the mixing ratio of (A)-2 to (B)-2 was 20:80.

Comparative Example 5

A film was prepared in the same manner as in Example 1 except that (B)-1 was not used, only (A)-1 was used, and the casting roller temperature was 160° C.

Comparative Example 6

A film was prepared in the same manner as in Example 1 except that (A)-1 and (B)-1 were not used, only (A)-2 was used, and the casting roller temperature was 160° C.

Comparative Example 7

A film was prepared in the same manner as in Example 1 except that (A)-1 was not used, only (B)-1 was used, and the casting roller temperature was 240° C.

Comparative Example 8

A film was prepared in the same manner as in Example 1 except that (A)-1 and (B)-1 were not used, only (B)-2 was used, and the casting roller temperature was 260° C.

[Evaluation of Film]

Each film produced in the examples and comparative examples was evaluated for various items, as described below. The term "longitudinal" of the film refers to the direction in which the film-like formed product is extruded from the T-die, and the term "transverse" refers to the direction perpendicular to the longitudinal direction.

<Crystal Melting Temperature>

The crystal melting temperature of each film with a thickness of 100 μm prepared in the examples and comparative examples was determined from the peak top temperature of an endothermic peak corresponding to crystal melting in a differential scanning calorimetry (DSC) curve detected while the film was heated in the temperature range of 25° C. to 400° C. at a heating rate of 10° C./min with a differential scanning calorimeter "Pyris 1 DSC (manufactured by PerkinElmer, Inc.)" in accordance with JIS K 7121: 2012.

<Heat of Crystal Melting>

The heat of crystal melting of each film with a thickness of 100 μm prepared in the examples and comparative examples was determined from the area of an endothermic peak corresponding to crystal melting in a differential scanning calorimetry (DSC) curve detected while the film was heated in the temperature range of 25° C. to 400° C. at a heating rate of 10° C./min with a differential scanning calorimeter "Pyris 1 DSC (manufactured by PerkinElmer, Inc.)" in accordance with JIS K 7122: 2012.

<Glass Transition Temperature>

The glass transition temperature of each film with a thickness of 100 μm prepared in the examples and comparative examples was determined with a viscoelastic spectrometer "DVA-200 (manufactured by IT Keisoku Seigyo Co., Ltd.)" from the peak top temperature of a loss tangent (tan δ) peak while the film was heated in the temperature range of 20° C. to 400° C. at a heating rate of 3° C./min in accordance with JIS K 7244-4: 1999.

<Melt Viscosity>

The melt viscosity of each film with a thickness of 100 μm prepared in the examples and comparative examples was determined with a capillary rheometer "Capilograph 1D (manufactured by Toyo Seiki Seisaku-Sho, Ltd.)" at 360° C. at a shear rate of 1000 s$^{-1}$ in accordance with JIS K 7199: 1999.

<Tensile Modulus at 20° C. Below and Above Glass Transition Temperature>

Each film with a thickness of 100 μm prepared in the examples and comparative examples was examined with the viscoelastic spectrometer "DVA-200 (manufactured by IT Keisoku Seigyo Co., Ltd.)" while the film was heated in the temperature range of 20° C. to 400° C. at a heating rate of 3° C./min in accordance with JIS K 7244-4: 1999. The storage modulus was measured at a temperature 20° C. lower than the glass transition temperature Tg measured by the glass transition temperature measurement described above (Tg−20° C.) and at a temperature 20° C. higher than the measured glass transition temperature Tg (Tg+20° C.) as tensile modulus E'(Tg−20° C.) and tensile modulus E'(Tg+20° C.), and the ratio E'(Tg−20° C.)/E'(Tg+20° C.) was calculated.

Tables 2 and 3 summarize the evaluation measurement results of Examples 1 to 12 and Comparative Examples 1 to 8. "-" in the evaluation results in Tables 2 and 3 indicates that no endothermic peak corresponding to crystal melting was observed in the measurement.

TABLE 2

| | | | Example 1 | Example 2 | Example 3 | Example 4 | Example 5 | Example 6 | Example 7 |
|---|---|---|---|---|---|---|---|---|---|
| Mixing ratio (parts by mass) | Poly(aryl ether ketone) resin (A) | (A)-1 | 80 | 60 | 40 | 20 | | | |
| | | (A)-2 | | | | | 80 | 60 | 40 |
| | Poly(ether imide sulfone) resin (B) | (B)-1 | 20 | 40 | 60 | 80 | 20 | 40 | 60 |
| | | (B)-2 | | | | | | | |
| Evaluation results | Crystal melting temperature | ° C. | — | — | — | — | 333 | 330 | — |
| | Heat of crystal melting | J/g | — | — | — | — | 21 | 16 | — |
| | Glass transition temperature | ° C. | 182 | 196 | 214 | 234 | 182 | 198 | 216 |
| | Melt viscosity@360° C., 1000 s$^{-1}$ | Pa·s | 540 | 680 | 820 | 960 | 530 | 660 | 790 |
| | E' (Tg − 20° C.) | MPa | 2300 | 1730 | 1380 | 1240 | 1640 | 1600 | 1390 |
| | E' (Tg + 20° C.) | MPa | 4.8 | 4.2 | 3.9 | 4.1 | 4.1 | 4.5 | 4.2 |
| | E' (Tg − 20° C.)/ E' (Tg + 20° C.) | — | 479 | 412 | 354 | 305 | 400 | 356 | 331 |

| | | | Example 8 | Example 9 | Example 10 | Example 11 | Example 12 |
|---|---|---|---|---|---|---|---|
| Mixing ratio (parts by mass) | Poly(aryl ether ketone) resin (A) | (A)-1 | | 80 | 60 | 40 | 20 |
| | | (A)-2 | 20 | | | | |
| | Poly(ether imide sulfone) resin (B) | (B)-1 | 80 | | | | |
| | | (B)-2 | | 20 | 40 | 60 | 80 |
| Evaluation results | Crystal melting temperature | ° C. | — | — | — | — | — |

TABLE 2-continued

|  |  |  |  |  |  |  |
|---|---|---|---|---|---|---|
| Heat of crystal melting | J/g | — | — | — | — | — |
| Glass transition temperature | °C. | 236 | 186 | 204 | 228 | 252 |
| Melt viscosity@360° C., 1000 s$^{-1}$ | Pa·s | 920 | 540 | 680 | 820 | 960 |
| E' (Tg − 20° C.) | MPa | 1410 | 1940 | 1560 | 1300 | 1460 |
| E' (Tg + 20° C.) | MPa | 4.4 | 4.6 | 3.7 | 3.5 | 2.2 |
| E' (Tg − 20° C.)/ E' (Tg + 20° C.) | — | 320 | 422 | 422 | 371 | 664 |

TABLE 3

|  |  |  | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|---|
| Mixing ratio (parts by mass) | Poly(aryl ether ketone) resin (A) | (A)-1 |  |  |  |  | 100 |  |  |  |
|  |  | (A)-2 | 80 | 60 | 40 | 20 |  | 100 |  |  |
|  | Poly(ether imide sulfone) resin (B) | (B)-1 |  |  |  |  |  |  | 100 |  |
|  |  | (B)-2 | 20 | 40 | 60 | 80 |  |  |  | 100 |
| Evaluation results | Crystal melting temperature | °C. | 333 | 333 | 334 | — | 308 | 332 | — | — |
|  | Heat of crystal melting | J/g | 19 | 13 | 2 | — | 5 | 30 | — | — |
|  | Glass transition temperature | °C. | 180,236 | 182,230 | 180,242 | 182,254 | 168 | 172 | 262 | 282 |
|  | Melt viscosity@360° C., 1000 s$^{-1}$ | Pa·s | 530 | 660 | 790 | 920 | 400 | 400 | 1100 | 1050 |
|  | E' (Tg − 20° C.) | MPa | 2010 | 1800 | 2180 | 1880 | 2470 | 2380 | 1470 | 1900 |
|  | E' (Tg + 20° C.) | MPa | 40 | 266 | 907 | 1840 | 4.2 | 4.4 | 6.8 | 4.7 |
|  | E' (Tg − 20° C.)/ E' (Tg + 20° C.) | — | 50 | 6.8 | 2.4 | 1.0 | 588 | 541 | 216 | 404 |

[Discussion]

The results in Tables 2 and 3 show that Examples 1 to 12 containing a specific combination of the poly(ether ketone ketone) resins (A)-1 and (A)-2 and the poly(ether imide sulfone) resins (B)-1 and (B)-2 have only one high glass transition temperature and a low melt viscosity, and therefore have high heat resistance, melt formability, and secondary processability.

By contrast, Comparative Examples 1 to 4, in which the poly(ether ketone ketone) resin (A)-2 and the poly(ether imide sulfone) resin (B)-2 are combined, have two glass transition temperatures due to phase separation and therefore have low secondary processability.

Comparative Examples 5 and 6, in which only the poly(ether ketone ketone) resin (A)-1 or (A)-2 is used, have a lower glass transition temperature and lower heat resistance than the examples containing the poly(ether imide sulfone) resin (B)-1 or (B)-2.

Comparative Examples 7 and 8, in which only the poly(ether imide sulfone) resin (B)-1 or (B)-2 is used, have higher melt viscosity and lower melt formability than the examples containing the poly(ether ketone ketone) resin (A)-1 or (A)-2.

Examples and Comparative Examples Relating to Production of Three-Dimensional Printing Filament

[Production of Three-Dimensional Printing Filament]

In the examples and comparative examples relating to the production of a three-dimensional printing filament, a three-dimensional modeling filament was produced as described below using the raw materials shown in Table 1 at a mixing ratio shown in Table 4 below.

Example 13

(A)-2 and (B)-1 were dry-blended at a mass ratio of 80:20. This resin mixture was kneaded in a co-rotating twin-screw kneader at 360° C. to produce a resin composition. The resin composition was extruded from a nozzle with a diameter of 2.5 mm in a single-screw extruder at a melting temperature of 360° C. and was then cooled to produce a filament with a diameter of 1.75 mm.

Example 14

A filament was prepared in the same manner as in Example 13 except that the mixing ratio of (A)-2 to (B)-1 was 60:40.

Example 15

A filament was prepared in the same manner as in Example 13 except that (A)-2 was replaced with (A)-3, (B)-1 was replaced with (C)-1, the mixing ratio of (A)-3 to (C)-1 was 60:40, and the kneading and extrusion temperature was 380° C.

Comparative Example 9

A filament was prepared in the same manner as in Example 13 except that (A)-2 was replaced with (A)-4, (B)-1 was replaced with (C)-1, and the mixing ratio of (A)-4 to (C)-1 was 60:40.

Comparative Example 10

A filament was prepared in the same manner as in Example 13 except that (A)-2 was replaced with (A)-4, and the mixing ratio of (A)-4 to (B)-1 was 60:40.

Comparative Example 11

A filament was prepared in the same manner as in Example 13 except that (B)-1 was not used, and only (A)-2 was used.

[Evaluation of Filament]

Each filament produced in the examples and comparative examples was evaluated for various items, as described below.

<Crystal Melting Temperature (Tm)>

The crystal melting temperature (Tm) (° C.) (in the process of reheating) was determined from a thermogram measured with a differential scanning calorimeter, trade name "Pyris 1 DSC", manufactured by PerkinElmer, Inc. in accordance with JIS K 7121 while approximately 10 mg of a sample was heated from 25° C. to 400° C. at a heating rate of 10° C./min, was held at the temperature for 1 minute, was then cooled to 25° C. at a cooling rate of 10° C./min, and was again heated to 400° C. at a heating rate of 10° C./min.

<Heat of Crystallization (ΔHc)>

The heat of crystallization (ΔHc) (in the process of cooling) was determined from a thermogram measured with the differential scanning calorimeter, trade name "Pyris 1 DSC", manufactured by PerkinElmer, Inc. in accordance with JIS K 7122 while approximately 10 mg of a sample was heated from 25° C. to 400° C. at a heating rate of 10° C./min, was held at the temperature for 1 minute, and was then cooled to 25° C. at a cooling rate of 10° C./min.

<Glass Transition Temperature (Tg)>

Each filament prepared in the examples and comparative examples was formed into a sheet by heat transfer pressing. The glass transition temperature (Tg) of the sheet was determined with the viscoelastic spectrometer "DVA-200 (manufactured by IT Keisoku Seigyo Co., Ltd.)" from the peak top temperature of a loss tangent (tan δ) peak while the film was heated in the temperature range of 20° C. to 400° C. at a heating rate of 3° C./min in accordance with JIS K 7244-4: 1999.

<Warping while Printing>

A dumbbell-shaped sample with a length of 75 mm, a width of 10 mm, and a thickness of 5 mm was formed as an evaluation sample with a 3D printer (manufactured by Minifactory, trade name: miniFactory Ultra). The sample thickness direction was defined as the Z-axis direction (lamination direction). At that time, a PEI sheet was applied to a modeling table, and modeling was performed at a printing table temperature of 155° C., at a chamber temperature of 155° C., at a nozzle temperature described below for each example, at a modeling speed of 30 mm/s, and at an internal filling rate of 100%.

(Nozzle Temperature)

Examples 13 and 14 and Comparative Example 11: 375° C.

Example 15 and Comparative Examples 9 and 10: 400° C.

The evaluation sample thus produced was removed from the printing table and was placed on a horizontal plane. The distances between four corners of the sample and the horizontal plane were measured. The average of the distances was defined as the amount of warping. Warping while printing was evaluated from the amount of warping in accordance with the following criteria.

A: The amount of warping was 1 mm or less.

B: The amount of warping was more than 1 mm and 2 mm or less.

C: The amount of warping was more than 2 mm. Otherwise, printing could not be completed due to large warping or nozzle clogging with filaments while printing.

<Interlayer Adhesion Properties>

It was evaluated by measuring tensile strength in accordance with JIS K 7161.

A dumbbell-shaped sample with a length of 75 mm, a width of 10 mm, and a thickness of 5 mm was formed as an evaluation sample I with the 3D printer (manufactured by Minifactory, trade name: miniFactory Ultra). The sample length direction was defined as the Z-axis direction (lamination direction). At that time, a PEI sheet was applied to a printing table, and printing was performed at a printing table temperature of 155° C., at a chamber temperature of 155° C., at a nozzle temperature described below for each example, at a printing speed of 30 mm/s, and at an internal filling rate of 100%.

(Nozzle Temperature)

Examples 13 and 14 and Comparative Example 11: 375° C.

Example 15 and Comparative Examples 9 and 10: 400° C.

The tensile strength of the evaluation sample I was measured in a tensile test at an initial grip distance of 45 mm and a speed of 50 mm/min at 23° C.

Separately, an evaluation sample II was prepared from a filament with an electric heating press at 380° C., and the tensile strength of the evaluation sample II was measured in the same manner.

The ratio of the tensile strength of the evaluation sample I to the tensile strength of the evaluation sample II was calculated, and the interlayer adhesion properties was evaluated from this ratio in accordance with the following criteria.

A: The tensile strength ratio was 30% or more.

B: The tensile strength ratio was 25% or more and less than 30%.

C: The tensile strength ratio was less than 25% or was not available due to incomplete printing.

<Heat Resistance>

A dumbbell piece formed in the interlayer adhesion test was used as an evaluation sample. The dumbbell piece was heated in an oven at 180° C. for 1 hour. Subsequently, the oblique distance of the sample was measured to examine the deformation due to modeling. From the amount of change, the heat resistance of the modeling product was rated in accordance with the following criteria.

A: The amount of change was less than 2 mm.

B: The amount of change was 2 mm or more and less than 10 mm.

C: The amount of change was 10 mm or more or was not available due to incomplete modeling.

<Chemical Resistance>

A dumbbell piece formed in the interlayer adhesion test was used as an evaluation sample. The dumbbell piece was immersed in acetone at normal temperature for 5 hours, and the rate of weight change due to immersion was measured.

From the rate of weight change, the chemical resistance of the printing product was rated in accordance with the following criteria.

A: The rate of weight change was less than 0.2%.
B: The rate of weight change was 0.2% or more and less than 0.4%.
C: The rate of weight change was 0.4% or more or was not available due to incomplete printing.

<Overall Rating>

The evaluation of warping, interlayer adhesion properties, heat resistance, and chemical resistance was rated in accordance with the following criteria.

S: The warping, interlayer adhesion properties, heat resistance, and chemical resistance were all rated "A".

A: One of the warping, interlayer adhesion properties, heat resistance, and chemical resistance was rated B", and the others were rated "A".

B: One or more of the warping, interlayer adhesion properties, heat resistance, and chemical resistance were rated "C", or two or more of them were rated "B".

Table 4 summarizes the evaluation measurement results of Examples 13 to 15 and Comparative Examples 9 to 11.

layer adhesion properties, high heat resistance, and high chemical resistance.

By contrast, in Comparative Example 9, in which the poly(aryl ether ketone) resin (A)-4 and the poly(ether imide) resin (C)-1 are combined, the ratio of the number of ether groups to the number of ketone groups of the poly(aryl ether ketone) resin (A)-4 is 2, and therefore the modeling product has low chemical resistance.

Comparative Example 10, in which the poly(aryl ether ketone) resin (A)-4 and the poly(ether imide sulfone) resin (B)-1 are combined, has two glass transition temperatures due to phase separation and therefore has low wire diameter stability and poor printing properties in the production of a filament.

Comparative Example 11, in which only the poly(aryl ether ketone) resin (A)-2 is used, has low heat resistance.

Although the present invention has been described in detail with reference to particular embodiments, it will be apparent to those skilled in the art that various modifications may be made therein without departing from the spirit and scope of the present invention.

TABLE 4

|  |  |  | Example 13 | Example 14 | Example 15 | Comparative Example 9 | Comparative Example 10 | Comparative Example 11 |
|---|---|---|---|---|---|---|---|---|
| Mixing ratio (parts by mass) | Poly(aryl ether ketone) resin (A) | (A)-1 |  |  |  |  |  |  |
|  |  | (A)-2 | 80 | 60 |  |  |  | 100 |
|  |  | (A)-3 |  |  | 60 |  |  |  |
|  |  | (A)-4 |  |  |  | 60 | 60 |  |
|  | Resin (A') compatible with poly(aryl ether ketone) resin (A) | (B)-1 | 20 | 40 |  |  | 40 |  |
|  |  | (B)-2 |  |  |  |  |  |  |
|  |  | (C)-1 |  |  | 40 | 40 |  |  |
| Evaluation results | Crystal melting temperature (Tm) | ° C. | 333 | 330 | 367 | 336 | 340 | 332 |
|  | Heat of crystallization (ΔHc) | J/g | 28 | 19 | 33 | 30 | 26 | 33 |
|  | Glass transition temperature (Tg) | ° C. | 182 | 200 | 230 | 182 | 178/250 | 170 |
|  | Warping while modeling | — | A | A | A | A | C | A |
|  | Interlayer adhesion properties | — | A | A | B | B | C | A |
|  | Heat resistance | — | A | A | A | A | C | C |
|  | Chemical resistance | — | A | A | A | B | C | A |
|  | Overall rating |  | S | S | A | B | B | B |

[Discussion]

The results in Table 4 show that Examples 13 to 15, which contains a specific combination of the poly(aryl ether ketone) resin (A)-2 or (A)-3 as the poly(aryl ether ketone) resin (A) with the ratio of the number of ether groups to the number of ketone groups being less than 2 and the poly(ether imide sulfone) resin (B)-1 or the poly(ether imide) resin (C)-1 as the resin (A') compatible with the poly(aryl ether ketone) resin (A), have only one high glass transition temperature and have good modeling properties, good inter- The present application is based on Japanese Patent Application No. 2019-181196 filed on Oct. 1, 2019, which is incorporated herein by reference in its entirety.

The invention claimed is:

1. A resin composition comprising: a poly(aryl ether ketone) resin (A); and a poly(ether imide sulfone) resin (B), wherein the poly(aryl ether ketone) resin (A) and the poly(ether imide sulfone) resin (B) are compatibly mixed.

2. The resin composition according to claim 1, wherein the poly(aryl ether ketone) resin (A) is a poly(ether ketone ketone) resin.

3. The resin composition according to claim 1, wherein the poly(aryl ether ketone) resin (A) has a repeating unit (a-1) represented by formula (1) and/or a repeating unit (a-2) represented by formula (2):

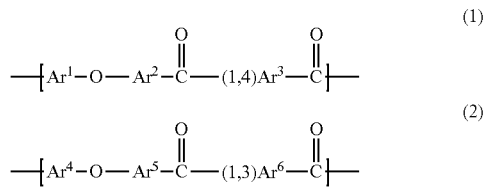

wherein $Ar^1$ to $Ar^6$ in the formulae (1) and (2) independently denote an optionally substituted arylene group having 6 to 24 carbon atoms, (1,4) $Ar^3$ in the formula (1) is bonded to a ketone group at positions 1 and 4 of the $Ar^3$ group, and (1,3) $Ar^6$ in the formula (2) is bonded to a ketone group at positions 1 and 3 of the $Ar^6$ group.

4. The resin composition according to claim 3, wherein the poly(aryl ether ketone) resin (A) has a repeating unit (a-1) represented by the formula (1) and a repeating unit (a-2) represented by the formula (2), and a unit mole ratio [(a-1)/(a-2)] of the repeating unit (a-1) to the repeating unit (a-2) ranges from 1 to 5.

5. The resin composition according to claim 4, wherein the repeating unit (a-1) represented by the formula (1) is a repeating unit represented by formula (1A), and the repeating unit (a-2) represented by the formula (2) is a repeating unit represented by formula (2A):

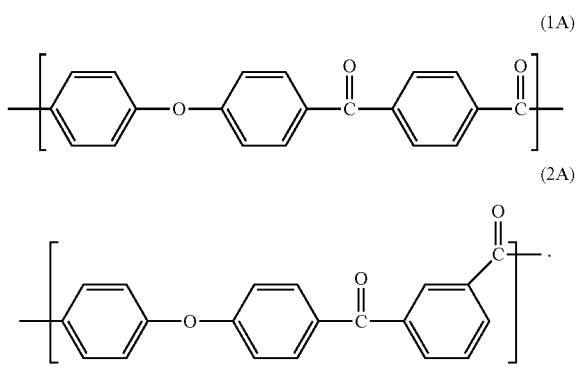

6. The resin composition according to claim 1, wherein the poly(ether imide sulfone) resin (B) has a repeating unit (b-1) represented by formula (3):

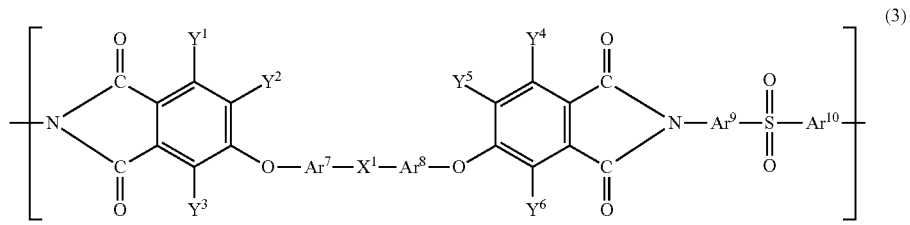

wherein $Y^1$ to $Y^6$ in the formula (3) independently denote a hydrogen atom, an alkyl group, or an alkoxy group, $Ar^7$ to $Ar^{10}$ independently denote an optionally substituted arylene group having 6 to 24 carbon atoms, and $X^1$ denotes a direct bond, a divalent aliphatic hydrocarbon group, —O—, —$SO_2$—, —S—, or —C(═O)—.

7. The resin composition according to claim 6, wherein the repeating unit (b-1) represented by the formula (3) is a repeating unit represented by formula (3A):

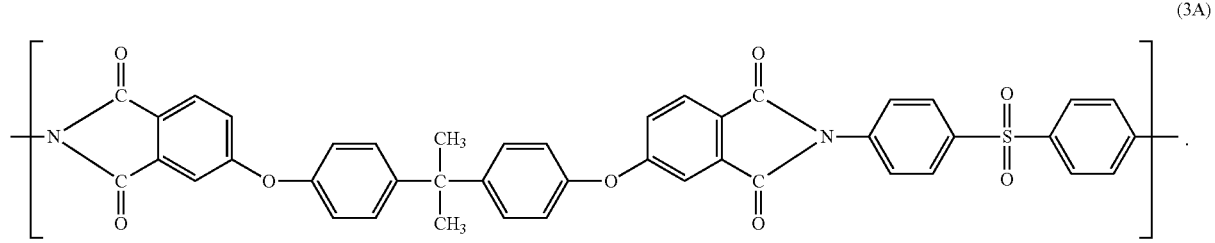

8. The resin composition according to claim 4, wherein the repeating unit (a-1) and the repeating unit (a-2) constituting the poly(aryl ether ketone) resin (A) have a unit mole ratio [(a-1)/(a-2)] ranging from 1 to 2, and the poly(ether imide sulfone) resin (B) has a repeating unit (b-2) represented formula (4):

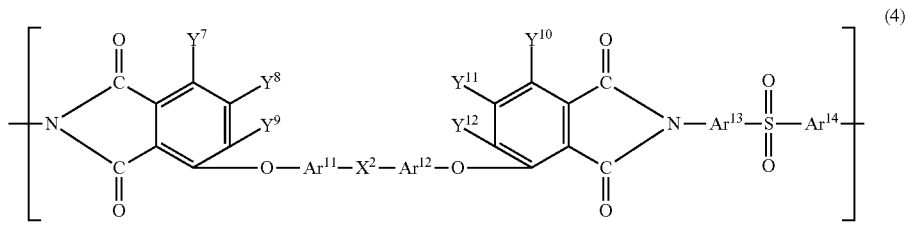

wherein $Y^7$ to $Y^{12}$ in the formula (4) independently denote a hydrogen atom, an alkyl group, or an alkoxy group, $Ar^{11}$ to $Ar^{14}$ independently denote an optionally substituted arylene group having 6 to 24 carbon atoms, and $X^2$ denotes a direct bond, a divalent aliphatic hydrocarbon group, —O—, —SO$_2$—, —S—, or —C(=O)—.

9. The resin composition according to claim 8, wherein the repeating unit (b-2) represented by the formula (4) is a repeating unit represented by (4A):

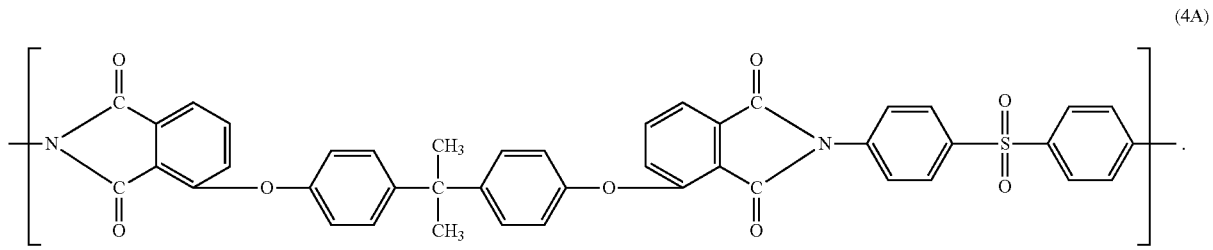

10. The resin composition according to claim 1, wherein a mass ratio of the poly(aryl ether ketone) resin (A) to the poly(ether imide sulfone) resin (B) ranges from 90:10 to 10:90 relative to 100% by mass of the poly(aryl ether ketone) resin (A) and the poly(ether imide sulfone) resin (B) in total.

11. The resin composition according to claim 1, wherein the resin composition has one glass transition temperature derived from the poly(aryl ether ketone) resin (A) and the poly(ether imide sulfone) resin (B).

12. The resin composition according to claim 11, wherein the glass transition temperature ranges from 180° C. to 260° C.

13. The resin composition according to claim 11, wherein a ratio E' (Tg−20° C.)/E' (Tg+20° C.) of a tensile modulus E' (Tg−20° C.) at a temperature 20° C. below the glass transition temperature to a tensile modulus E' (Tg+20° C.) at a temperature 20° C. above the glass transition temperature ranges from 100 to 1000.

14. The resin composition according to claim 1, wherein the resin composition has a melt viscosity ranging from 100 to 1000 Pa·s at 360° C. and at a shear rate of 1000 s$^{-1}$.

15. A film comprising the resin composition according to claim 1.

16. A composite material comprising the resin composition according to claim 1 and a reinforcing fiber.

17. The composite material according to claim 16, wherein the composite material is a prepreg or semipreg.

18. A moving body, comprising the composite material according to claim 16.

19. A three-dimensional printing material comprising the resin composition according to claim 1.

20. A three-dimensional printing filament comprising the three-dimensional printing material according to claim 19.

21. The three-dimensional printing filament according to claim 20, wherein the filament has a diameter ranging from 1.0 to 5.0 mm.

22. A roll of the three-dimensional printing filament according to claim 20.

23. A three-dimensional printing cartridge comprising the three-dimensional printing filament according to claim 20 in a container.

24. A formed body comprising the three-dimensional printing material according to claim 19.

* * * * *